United States Patent
Rose et al.

(10) Patent No.: US 10,261,764 B2
(45) Date of Patent: Apr. 16, 2019

(54) HANDLING VALUE TYPES

(71) Applicant: Oracle International Corporation, Redwood Shores, CA (US)

(72) Inventors: John Robert Rose, San Jose, CA (US); Brian Goetz, Williston, VT (US); Guy Steele, Lexington, MA (US)

(73) Assignee: Oracle International Corporation, Redwood Shores, CA (US)

( * ) Notice: Subject to any disclaimer, the term of this patent is extended or adjusted under 35 U.S.C. 154(b) by 437 days.

(21) Appl. No.: 14/699,129

(22) Filed: Apr. 29, 2015

(65) Prior Publication Data
US 2015/0331681 A1 Nov. 19, 2015

Related U.S. Application Data

(60) Provisional application No. 61/992,753, filed on May 13, 2014.

(51) Int. Cl.
*G06F 8/30* (2018.01)
*G06F 8/41* (2018.01)

(52) U.S. Cl.
CPC ............. *G06F 8/437* (2013.01); *G06F 8/315* (2013.01); *G06F 8/4441* (2013.01)

(58) Field of Classification Search
CPC ........ G06F 8/437; G06F 8/315; G06F 8/4441; G06F 8/447; G06F 8/52
See application file for complete search history.

(56) References Cited

U.S. PATENT DOCUMENTS

| | | | |
|---|---|---|---|
| 6,442,751 B1 * | 8/2002 | Cocchi | G06F 8/437 707/999.202 |
| 6,851,109 B1 * | 2/2005 | Alexander, III | G06F 9/45516 717/118 |
| 7,558,935 B1 * | 7/2009 | Boucher | G06F 8/4441 711/132 |
| 7,774,376 B1 * | 8/2010 | Meijer | G06F 8/315 707/802 |
| 8,402,451 B1 * | 3/2013 | Sweeney | G06F 8/433 717/158 |

(Continued)

OTHER PUBLICATIONS

Harvin et al., "Stack variables vs. Heap variables," 2011, pp. 1-4, downloaded from the Wayback Machine Internet Archive at <url>:https://web.archive.org/web/20140415204134/http://stackoverflow.com/questions/5258724/stack-variables-vs-heap-variables.*

(Continued)

*Primary Examiner* — Thuy Dao
*Assistant Examiner* — Stephen D Berman
(74) *Attorney, Agent, or Firm* — Hickman Palermo Becker Bingham LLP

(57) ABSTRACT

In one approach, a method comprises receiving one or more higher-level instructions specifying to assign a value of a particular value type to a particular container of a plurality of containers, wherein the plurality of containers represent a data structure for maintaining one or more variables during execution of a block of code, wherein at least two containers of the plurality of containers are different sizes; generating one or more lower-level instructions that assign the value to the particular container based on applying one or more assignment rules to the one or more higher-level instructions based on the particular value type and executing the one or more lower-level instructions.

21 Claims, 7 Drawing Sheets

(56) References Cited

U.S. PATENT DOCUMENTS

| | | | |
|---|---|---|---|
| 9,454,620 B2* | 9/2016 | Sabbouh | G06F 8/10 |
| 2002/0095453 A1* | 7/2002 | Steensgaard | G06F 9/5016 |
| | | | 718/107 |
| 2003/0126590 A1* | 7/2003 | Burrows | G06F 9/30192 |
| | | | 717/154 |
| 2004/0177233 A1* | 9/2004 | Kubiczek | G06F 7/785 |
| | | | 712/202 |
| 2004/0177234 A1* | 9/2004 | Kubiczek | G06F 9/30076 |
| | | | 712/209 |
| 2005/0055682 A1* | 3/2005 | Gadre | G06F 8/315 |
| | | | 717/146 |
| 2006/0015528 A1* | 1/2006 | Hejlsberg | G06F 8/437 |
| 2006/0070049 A1* | 3/2006 | Chung | G06F 9/45516 |
| | | | 717/148 |
| 2007/0094647 A1* | 4/2007 | Meijer | G06F 8/437 |
| | | | 717/140 |
| 2009/0150422 A1* | 6/2009 | Meijer | G06F 8/52 |
| 2012/0158801 A1* | 6/2012 | Devegowda | G06F 12/0261 |
| | | | 707/816 |
| 2012/0185834 A1* | 7/2012 | Ohrstrom | G06F 9/45504 |
| | | | 717/148 |
| 2013/0067155 A1* | 3/2013 | Bates | G06F 9/468 |
| | | | 711/104 |
| 2013/0325904 A1* | 12/2013 | Clifford | G06F 8/437 |
| | | | 707/801 |
| 2014/0046984 A1* | 2/2014 | Sollich | G06F 8/4434 |
| | | | 707/803 |
| 2014/0068557 A1* | 3/2014 | Vanags | G06F 8/437 |
| | | | 717/116 |
| 2014/0317609 A1* | 10/2014 | Bauer | G06F 8/4434 |
| | | | 717/158 |
| 2015/0277881 A1* | 10/2015 | Strehovsky | G06F 8/49 |
| | | | 717/154 |

OTHER PUBLICATIONS

Cadenhead et al., "Working with Objects in Java Programming," 2004, pp. 1-2, downloaded from the Wayback Machine Internet Archive at <url>:https://web.archive.org/web/20120404185008/http://www.informit.com/articles/article.aspx?p=174371&seqNum=2.*

Wikipedia, "Java bytecode instruction listing," 2012, pp. 1-11, downloaded from the Wayback Machine Internet Archive at <url>: https://web.archive.org/web/20120208064249/https://en.wikipedia.org/wiki/Java_bytecode_instruction_listings.*

Wikipedia, "Java Virtual Machine," 2013, pp. 1-7, downloaded from the Wayback Machine Internet Archive at <url>:https://web.archive.org/web/20130425115947/https://en.wikipedia.org/wiki/Java_virtual_machine.*

Wikipedia, "Java Virtual Machine," 2013, pp. 1-9, downloaded from the Wayback Machine Internet Archive at <url>:https://web.archive.org/web/20130425115947/https://en.wikipedia.org/wiki/Java_virtual_machine.*

Wikipedia, "Java bytecode instruction listing," 2012, pp. 1-16, downloaded from the Wayback Machine Internet Archive at <url>: https://web.archive.org/web/20120208064249/https://en.wikipedia.org/wiki/Java_bytecode_instruction_listings.*

Antonia Zhai et al., "Compiler Optimization of Memory-Resident Value Communication Between Speculative Threads," 2004, Proceedings of the international symposium on Code generation and optimization: feedback-directed and runtime optimization, p. 39, downloaded on Nov. 20, 2018 at <url>:https://dl.acm.org (Year: 2004).*

Shup Wang et al., Thread-Associative Memory for Multicore and Multithreaded Computing, 2007, Proceedings of the 2006 International Symposium on Low Power Electronics and Design, p. 139-142, downloaded on Nov. 20, 2018 at <url>: https://ieeexplore.ieee.org. (Year: 2007).*

David Bacon et al., "Guava: a dialect of Java without data races," 2000, roceedings of the 15th ACM SIGPLAN conference on Object-oriented programming, systems, languages, and applications, pp. 382-400, downloaded on Nov. 20, 2018 at <url>:https://dl.acm.org. (Year: 2000).*

Serrano et al., "Storage Use Analysis and its Applications",dated May 24, 1996, ACM, 12 pages.

Odersky et al., "Combinging Scala and Java", Chapter 29 Programming in Scala, First Edition, dated Dec. 10, 2008, 10 pages.

Lombart, Olivier, "Allocate your Dynamic Strings on the Stack", Code Project for Who Code, dated Jun. 5, 2005, 12 pages.

Lindholm et al., "The Java Virtual Machine Specification", Java SE 7 Edition, Chapter 2, dated Feb. 28, 2013, 34 pages.

ISO/IEC, Committee Draft, "Programming languages—C", ISO/IEC 9899:201x, Section 6.3, dated Apr. 12, 2011, 3 pages.

* cited by examiner

HANDLING VALUE TYPES

PRIORITY CLAIMS

Related Applications

This application is a non-provisional of U.S. Patent Application No. 61/992,753, filed May 13, 2014, entitled "Handling Value Types", the entire contents of which is incorporated for all purposes as though fully stated herein.

TECHNICAL FIELD

Embodiments relate generally to techniques for supporting and/or utilizing value type constructs within programming languages.

BACKGROUND

Computer languages offer a multitude of different ways to create aggregate types. For example, languages such as Java offer heterogeneous aggregates with identity (e.g. "classes") and homogenous aggregates with identity (e.g. "arrays"). Identity is implemented by header information that is included with each instantiated object, such as an identification number (e.g. memory address) that uniquely identifies the object. However, object identity has footprint and performance costs, which is a major reason Java has primitive types that are stored in place, are passed by value without using a reference during method invocations, and do not include a header. This is opposed to reference types, which are accessed by a pointer, are represented using references which are passed by value during method invocations, and include a header. The cost of supporting identity is most burdensome for small objects, which do not have many fields to amortize the extra costs required to support identity.

For example, consider a Point class which has x and y fields of type int. In an implementation, an array of Point objects that each could include an extra object header (8 to 16 bytes) and a reference (4 to 8 bytes), meaning those 8 bytes of data (for the x and y integers) take up 20 to 32 bytes of heap space. Furthermore, iterating through this array means a pointer dereference for every Point object that is visited. This destroys the inherent locality of arrays and limits program performance.

Programmers often resort to tricks like representing an array of points as two arrays of ints (one for x and one for y) to avoid these costs, but this approach sacrifices encapsulation (and maintainability) just to reclaim the performance lost to identity. One approach is to significantly expand the number of primitives supported by the language. However, it can be difficult (if not impossible) to anticipate the primitive types that would be required to efficiently solve every problem put before a programmer. As a result, a construct which falls between the realms of primitive types and objects would be a great benefit to programmers.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
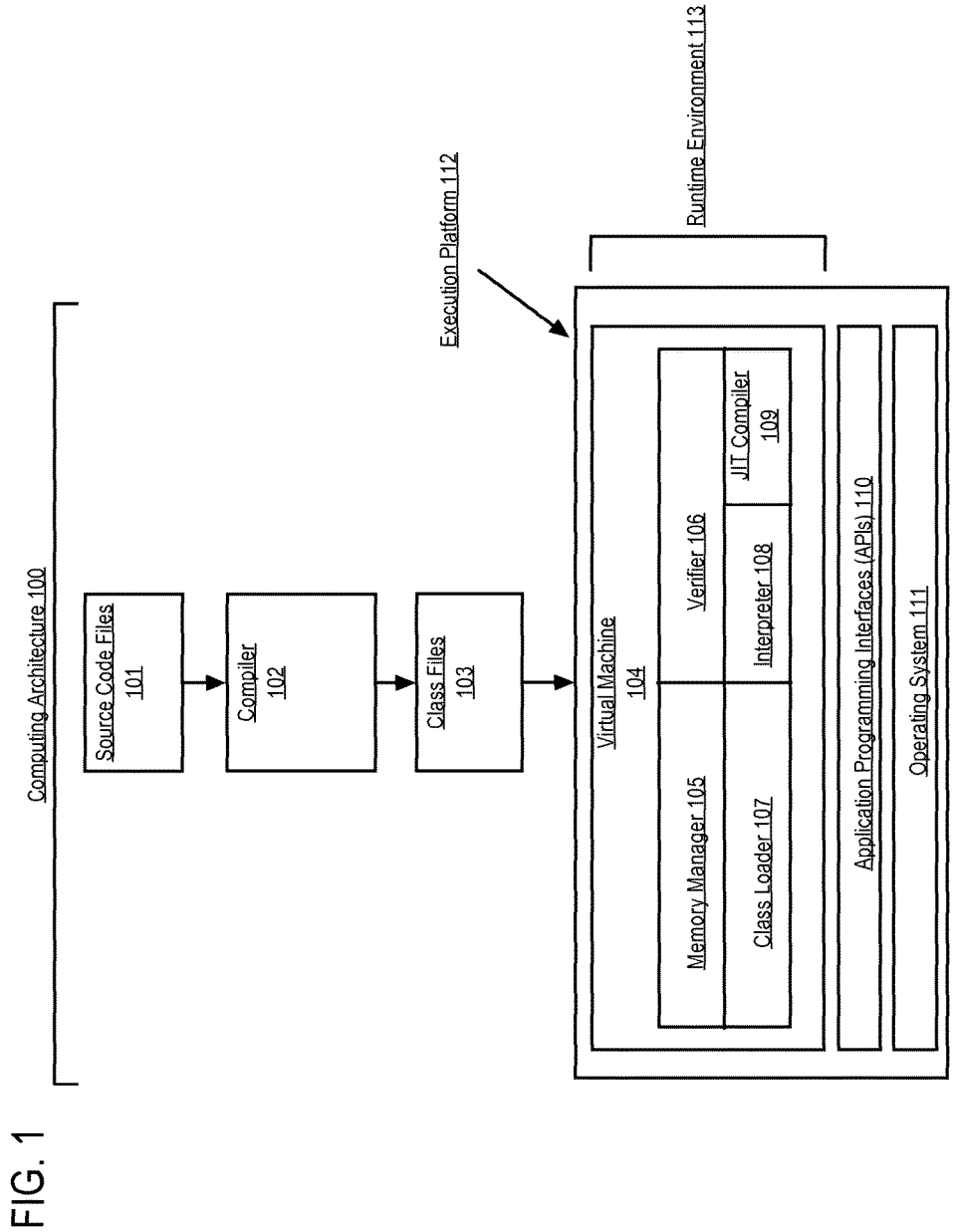
FIG. 1 illustrates an example computing architecture in which techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Operating Environment
  2.1 Example Class File Structure
  2.2 Example Virtual Machine Architecture
  2.3 Loading, Linking, and Initializing
3.0 Value Type Overview
  3.1 Use Cases
  3.2 Example Value Type Characteristics
  3.3 Example Restrictions
  3.4 Pointer Management
  3.5 Example Definitions
  3.6 Example Usage
  3.7 Example Implementation Details
  3.8 Example Bytecode and Type Descriptors
  3.9 Boxing and Object Interoperability
  3.10 Example Code
  3.11 Additional Example Options
  3.12 Migration of Types to Value Types
  3.13 Updating a Value of a Field
4.0 Modified Loading Procedure
5.0 Storage Considerations
  5.1 Storage Process Flow
6.0 Atomic Operations
7.0 Hardware Overview
8.0 Extensions and Alternatives
9.0 First Additional Disclosure
10.0 Second Additional Disclosure

1.0. General Overview

The techniques described herein often use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions". Furthermore, the term "method" is also synonymous with the terms "class method"

or "object method". A method is a set or block of code which is referred to by name and can be called (invoked) at various points in a program, which causes the method's code to be executed.

In an embodiment, value types are a category of aggregates following the axiom of "codes like a class, works like an int". Thus, like classes, value types can be defined by the programmer in terms of named, type components (fields), behavior (methods), privacy (access control), programmatic initialization (constructors), and so forth. However, like primitive types (such as ints), value types do not contain header information and are effectively treated as user-defined primitives. Thus, when feasible, value types are stored as flattened representations and are passed by value from method to method. As a result, compared to objects, a speed improvement is realized by not requiring a pointer to be dereferenced to access the value types and a storage improvement is realized by not requiring the value types to store header information. However, embodiments are free to implement aspects of value types in many ways, some of which may violate the "codes like a class, works like an int" axiom. Thus, features of value types described herein can be implemented separately, as a whole, or in any combination without restriction.

However, in order to implement value types there are a number of considerations. One consideration is how to surface value types in the source language and/or instruction set of a virtual machine (when applicable). For example, since value types do not contain headers with identifying information, many features which rely on identity either have to be disabled for value types or assigned a new meaning within the context of value types. As another example, additional instructions and/or keywords can be added to the source language/virtual machine instruction set to define and utilize value types. Section 3.0 "Value Type Overview" and its related subsections are generally directed towards the issues of how to surface value types in a source language and/or virtual machine instruction set.

Another consideration is how to handle the storage of value types within the working memory of a computer system, such as a runtime environment of a virtual machine. As mentioned above, value types are intended to be stored in a flattened representation. Thus, for example, if an object has a field storing a value type, the value type is intended to be stored in place without pointer indirection. As another example, when a value type is loaded into a local variable in a stack frame, the value type is stored flat in the container representing the local variable. However, because value types can be of variable sizes there are situations where the container might need to be resized in order to fit a particular value type. This creates a performance issue, since reallocating memory for containers can entail a significant amount of overhead, especially if the reallocation is performed very often.

Thus, in some embodiments, optimizations are implemented to set bounds on the cost of storing value types. For example, a verifier of a virtual machine can define a number of assignment rules that are checked when an instruction is received to place a value type in a container. For instance, the verifier might prevent a container which had been allocated for one value type from being used to store a value type of a different size. Thus, the virtual machine is prevented from constantly reallocating containers to fit different value types. As another example, if the value type is beyond a size threshold and is determined to be immutable, the virtual machine can opt to store the value type on managed heap memory and instead store a reference to the heap in the container. As a result, the virtual machine is prevented incurring the overhead of copying oversized value types multiple times. For example, if the local variable is placed on an operand stack, the local variable can be copied by reference as opposed to by value. However, since the value type is immutable, the behavior of instructions (from a semantic standpoint) is indistinguishable to an end user from the case where the value type is stored and passed by value. This might result in increased time for access, but for large value types the amount of time spent copying could greatly eclipse the benefit of removing the pointer traversal. Section 5.0 "Storage Considerations" and its related subsections are generally related to the issue of storage optimizations and performance.

In some embodiments, value types are immutable, meaning that the value type (at least from the perspective of an end user) cannot be updated in a piece-wise fashion. This is similar to how some languages, such as Java, allow an integer held by a variable to be replaced, but does not provide instructions to the user allowing a single bit of the integer to change the value. Thus, immutability in the context of a value type means that the value type can only be replaced as a whole. However, even when the value type is immutable, the value type could still be stored in a mutable variable or container. In the context of a variable, field, or container, immutability implies that the value held by that variable or container cannot be replaced (e.g. is frozen).

Another consideration is how to prevent the tearing of value types when accessed by multiple threads. Assuming the value type is stored in shared memory, such as the heap of many virtual machine implementations, there is a risk of race conditions as multiple threads simultaneously access the value type. Since a value type is intended to function as a whole value, such as a primitive int, structure tearing occurs when a first thread attempts to update a container storing the value type and a second thread reads container before the first thread completely finishes the update. As a result, the second thread encounters value type in the container that is partially the old value and partially the new value. In order to prevent structure tearing, techniques are applied to make store and load operations atomic. However, since value types are user defined, the proper approach to perform the atomic access can vary based on the size and/or use of the value type and also the hardware capabilities of the underlying computer system. For example, some central processing units (CPUs) support atomic updates and/or transactions for various sizes (e.g. 64 bits, 128 bits, 256 bits, etc.), but those hardware instructions cannot account for every size that might be used for a value type. Thus, because value types may be larger than the largest atomic memory transfer supported by the underlying hardware, structure tearing becomes a possibility, since (for example) a write to a 4-component value might be broken up into two 64-bit writes and a read of that value might be broken up into two 64-bit reads. As a result, if both the read and the write are performed simultaneously, it becomes possible to encounter a value type that is a mix of the old and the new value.

In an embodiment, atomic operations for value types are optimized using a number of techniques. For example, if a hardware instruction is available to perform an atomic operation that instruction is preferred since hardware-implemented techniques generally have better performance compared to software-implemented techniques. Furthermore, in certain circumstances, atomic operations can be bypassed, such as when the field being accessed is immutable. In some embodiments, when a field of a value type is accessed frequently, the value type is modified to place the field in a separate container which is accessed by a pointer reference. Atomic updates to fields accessed through pointers can be performed relatively quickly by creating a copy of the updated value and switching the pointer. Thus, by modifying the structure of the value type, increased performance can be obtained when performing atomic access. Section 6.0 "Atomic Operations" is generally directed towards issues involving atomic operations.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a verifier 106 to check the validity of class files 103 and method instructions, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach is generally inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
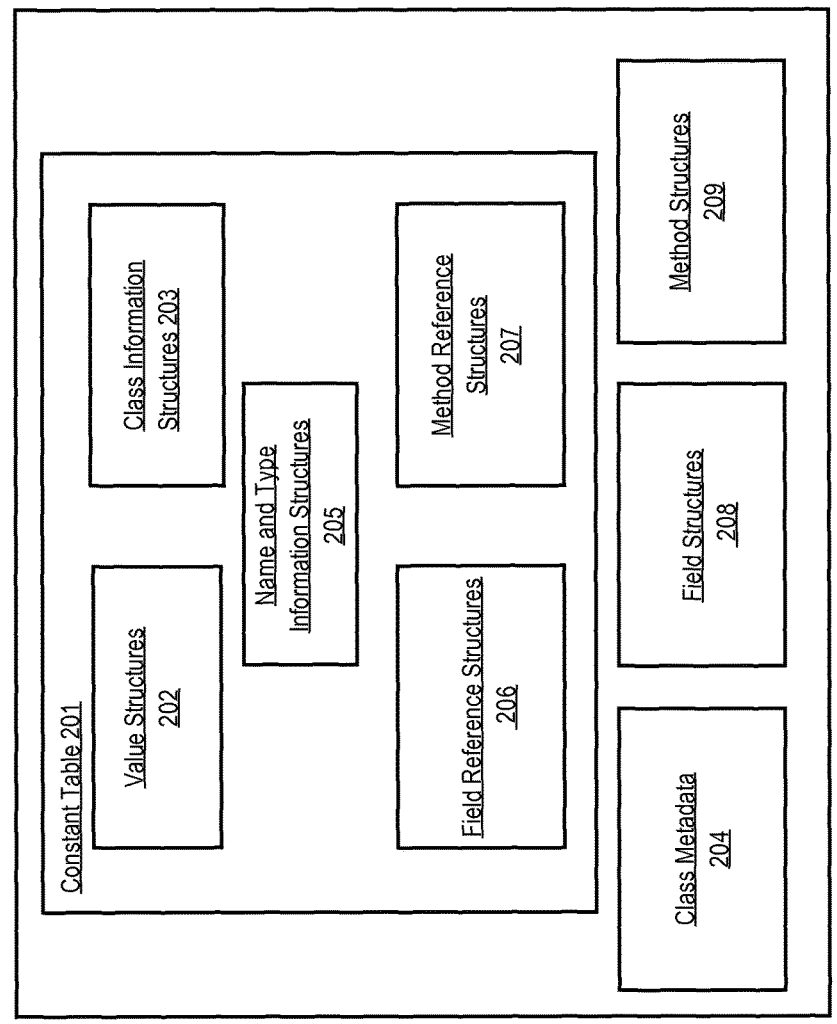
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, and method structures 209.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
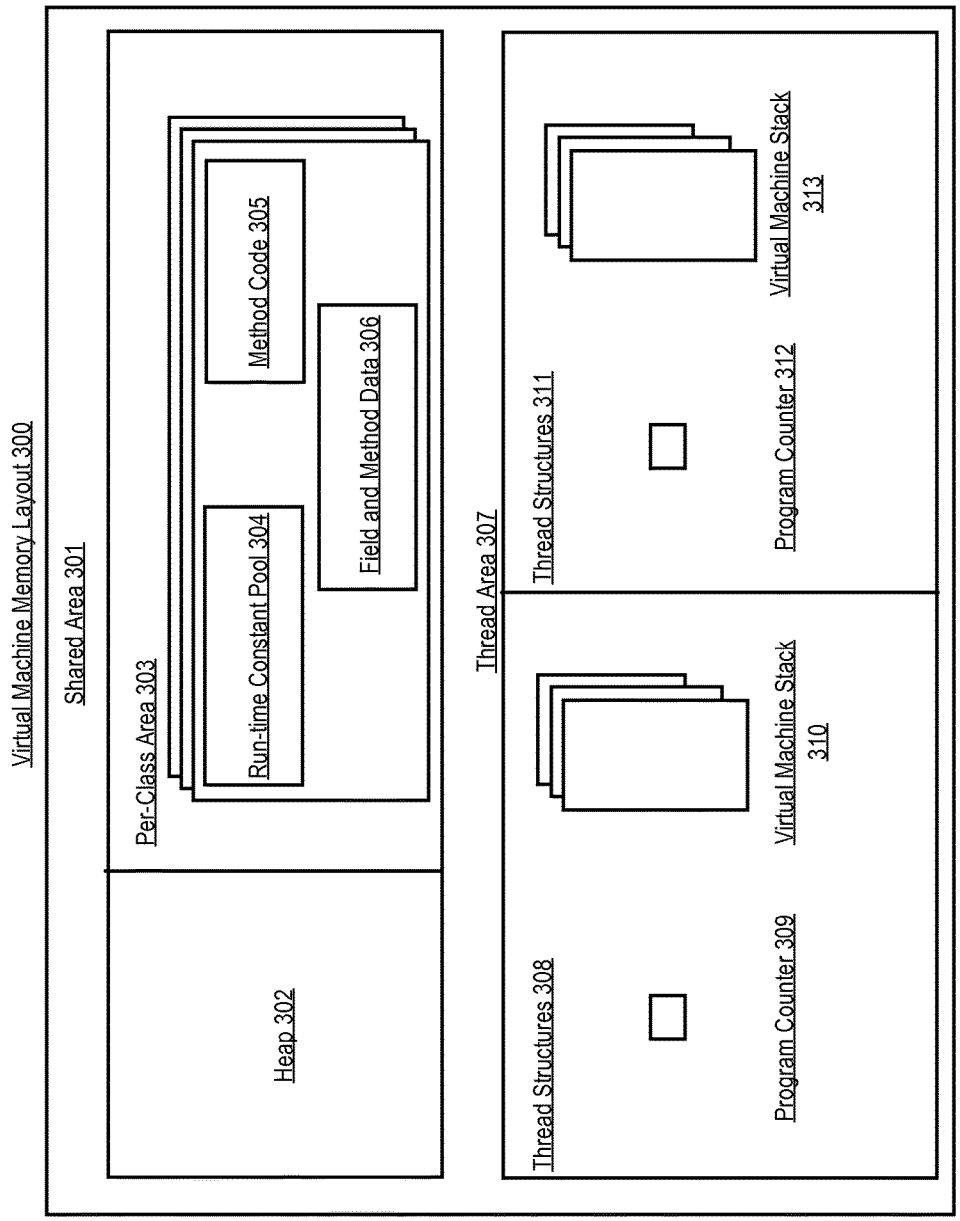
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
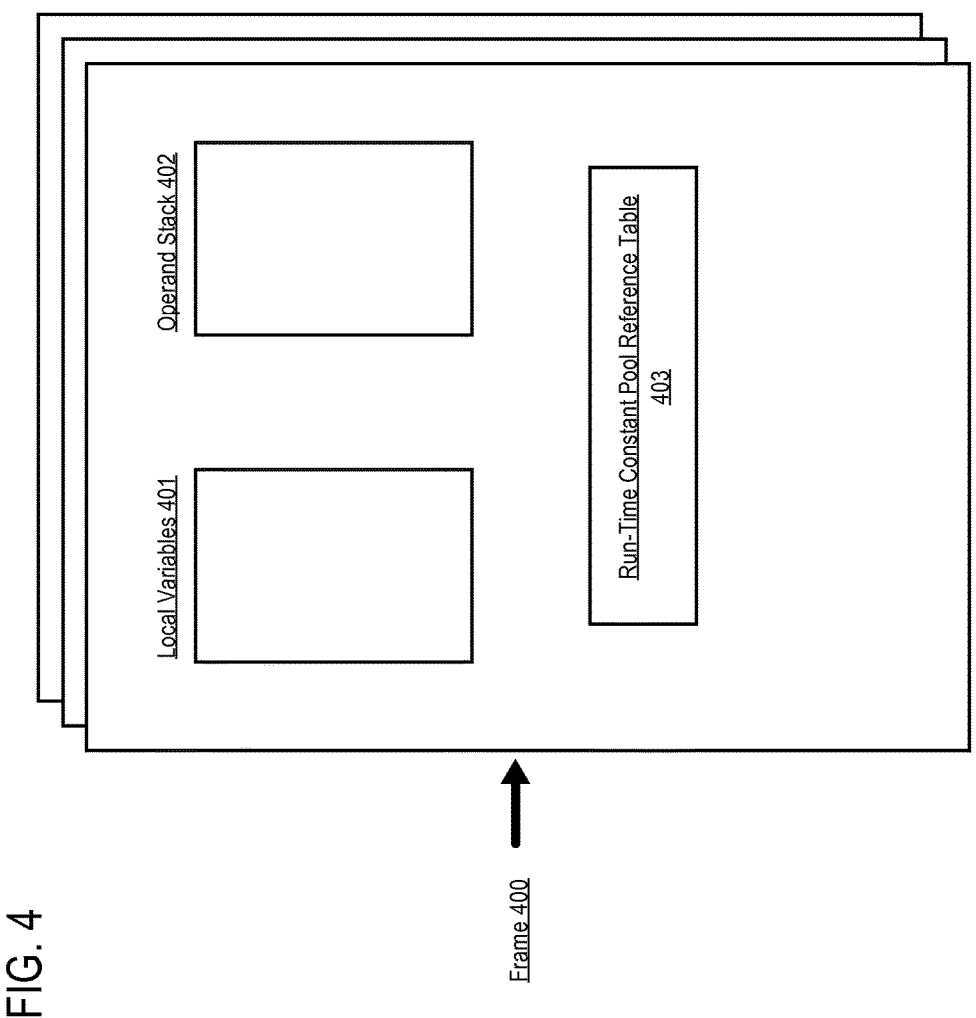
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 501 onto the operand stack 502. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

Although the local variables 401 and the operand stack 402 are referred to using data structures such as "arrays" and/or "stacks", there is no limit to the type of data structure used to implement those elements. In addition, the data structures referred to herein with respect to the local variables 401 and operand stack 402 relate to high level representations of the data structure. Embodiments can implement those data structures using a variety of lower level storage mechanisms, such as storing one or more values of the local variables 401 and/or the operand stack 402 in one or more registers of a central processing unit (CPU) of the machine hardware executing the virtual machine 104. The lower-level instructions may reference one or more lower-level storage mechanisms that are transparent to the higher-level instructions. Although higher-level instructions could be implemented using a variety of lower-level storage mechanisms, none of which are specified by the higher-level instructions, the lower-level instructions reference one or more particular storage mechanisms for carrying out the higher-level instructions.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 Value Type Overview

In some embodiments, the virtual machine 104 offers a multitude of different ways to create aggregate types. For example, the virtual machine 104 can offer heterogeneous aggregates with identity (e.g. via "classes") and homogenous aggregates with identity (e.g. via "arrays"). A value type represents another category of aggregates that is heterogeneous and without identity. Thus, similar to primitive types (such as byte, short, int, long, float, double, char, and boolean), if two memory areas contain the same value type, the data in those memory areas cannot be differentiated. This is opposed to, in some embodiments, class objects which each contain header information with a unique identification number, such as the memory address of the object. Object identity has footprint and performance costs, which is a major reason Java, unlike many other object oriented languages, has primitives. These costs are most burdensome for small objects, which do not have many fields to amortize the extra costs.

In some embodiments, in terms of footprint, objects with identity are allocated on the heap 302, have object headers of one or more words, and (unless dead) have one or more pointers pointing at them. In terms of performance, each distinct instance can be allocated on the heap 302 and each access involves a dependent load (pointer traversal) to get to the "payload", even if the object contains just a single field (for example, java.lang.Integer). Also, in Java, the object header supports numerous identity based operations including Object.getClass, Object.wait, and System.identityHashCode.

Object identity serves to support mutability, where the state of an object can be mutated but remains the same intrinsic object. For example, a field of the object may be modified, but the header information still identifies the object as being the "same", despite the change in the value of the field. In addition, in some embodiments, object identity also serves to support polymorphism. However, many programming idioms do not require identity, and would benefit from not paying the memory footprint, locality, and optimization penalties of identity. Despite significant attempts, many virtual machines are still poor at figuring out whether identity is significant to the program, and so may pessimistically support identity for many objects that do not need it.

In some implementations, even a nominally stateless object (with all final fields) may have its identity tracked at all times, even in highly optimized code, lest the object be used as a means of synchronization or by any other mechanism that relies upon identity. This inherent "statefulness" impedes many optimizations. In some cases, escape analysis techniques can sometimes mitigate these costs, but these techniques are fragile in the face of code complexity, and break down almost completely with separate compilation.

Running Example: Point

---

Consider a Point class:
```
final class Point {
    public final int x;
    public final int y;
    public Point(int x, int y) {
        this.x = x;
```

-continued

```
        this.y = y;
    }
}
```

Even though Point is immutable, the virtual machine 104 does not necessarily know that the identity of the Point object will never be used (for example, using the object as an intrinsic lock for synchronization purposes). As a result, Point is represented as a "box" object for x and y. In an implementation, an array of Point objects includes an extra object header (8 to 16 bytes) and a reference (4 to 8 bytes), meaning those 8 bytes of data (for the x and y ints) take up 20 to 32 bytes of heap space, and iterating this array means a pointer dereference for every Point object that is visited. This destroys the inherent locality of arrays and limits program performance (not to mention that allocation entails works for the garbage collector). Programmers often resort to tricks like representing an array of points as two arrays of ints to avoid these costs, but this sacrifices encapsulation (and maintainability) just to reclaim the performance lost to identity. If, on the other hand, a Point could be represented in the same manner as a primitive type, such as an int, the virtual machine 104 could store Points in registers, push them on the stack, iterate through an array with locality, and use far less memory, with no loss of encapsulation.

In an embodiment, value types represent user-defined aggregate types without identity that can be surfaced in the language of the source code files 101 and the instruction set of the virtual machine 104 to support memory- and locality-efficient programming idioms without sacrificing encapsulation. In an embodiment, value types are heterogeneous aggregates that can contain primitive types, reference types, or even other value types.

In some embodiments, many of the definitions and encapsulation machinery used for classes, for example in Java, can be used to easily and safely build a new value type construct based data structures. For example, value types can be treated as a form of specially marked and restricted class definitions. However, at the same time, value types function (in a semantic sense) as simply a new kind of primitive to users of the virtual machine 104.

As will be explored in following sections, while value types are usefully similar to classes, it is useful (as with primitives) to make clear and systematic distinctions between a value type and a reference type. Thus, in some embodiments, new instructions are added to the instruction set of the virtual machine 104 to create, release, and/or modify value types. However, in other embodiments, current instructions are overloaded to perform different functionality depending on whether an instruction is operating on a reference, a primitive type, and/or a value type.

3.1 Use Cases

In an embodiment, value types can be introduced to the virtual machine 104 to support many features that otherwise might not exist or would be implemented sub-optimally using identity based aggregates. However, the following examples can be implemented efficiently using value types. Some examples include:

Numerics.

Some virtual machines, such as the JVM, offer only a limited number of efficient numeric types; if the problem cannot be efficiently solved using those numeric types, than aggregates with identity (and the associated overheads) have to be used instead. Numeric types like complex numbers, extended-precision or unsigned integers, and decimal types are widely useful but can only be approximated (to the detriment of type safety, encapsulation, and/or performance) by primitives and/or object classes.

Native Types.

Modern processors support a wide variety of native data types, and (as with numerics) only a few of them map directly to primitives supported by virtual machines. This makes it difficult or impossible to write code which compiles directly to instructions involving native types, such as vector instructions.

Algebraic Data Types.

Data types like Optional<T> or Choice<T,U> can be implemented using an object box. However, many such types (especially product types like tuples) have natural representations in terms of small identityless aggregates. Unit types (both void-like and metric) are also sometimes useful to represent algebraic data types, but only if their footprint overhead can be significantly reduced or driven to zero.

Tuples.

A tuple of values may itself be regarded as a value and does not necessarily require an object box.

Cursors.

An iterator or other cursor into a complex data structure and does not necessarily require an object box. Moreover, clients of data structures (managed and/or native) can pass around iterators and other "smart pointers" into the data structures with full encapsulation and type safety.

3.2 Example Value Type Characteristics

In some embodiments, a value type facility at the virtual machine 104 level offers one or more of the following beneficial characteristics:

Scalarization.

In some embodiments, instances of value types can be routinely broken down into their components and stored in registers or the stack (such as virtual machine stack 310), rather than on the heap 302. When stored in the heap 302 as part of a containing object, the virtual machine 104 is free to use flattened, pointer-free representations of the value types.

Wrapping.

In some embodiments, value types have both an unboxed and a boxed representation. The unboxed representation is used where practical to reduce overhead; the boxed representation is used for interoperability with APIs that require reference types. Unlike, for example, the existing primitive wrappers in Java, the boxed representation can be automatically generated from the description of the value type. For example, each value type can be defined using a class file and the virtual machine 104 uses that class file to automatically generate a new class file representing the box object for the value type. As another example, a value type defined in the source code files 101 are compiled by the compiler 102 into separate class files for the value type and the boxed form of the value type. As yet another example, both the value type and the boxed form of the value type can share the same class file, but the virtual machine will treat uses of the value type differently depending on context.

Behavior.

In some embodiments, value types are more than tuples of data; they can also define behavior, in the form of methods. For example, the definition of a complex number value type could define methods to perform complex arithmetic. The virtual machine 104 may then choose to intrinsify the behavior if a hardware primitive is available, say for 128-bit numerics. Similarly, a data structure cursor could define factory and access methods, while keeping its component values securely encapsulated. Utility methods, such as toString and equals in Java, could be forced onto value classes, but not necessarily. In some embodiments, utility methods are customizable on a value type by value type basis.

Names.

Some type systems, such as the JVM type system, are almost entirely nominal as opposed to structural. Likewise, in some embodiments, components of value types may be identified by names, rather than just element number. (This makes value types more like records than tuples).

Interoperability.

In some virtual machines, such as the JVM, there are a number of operations on generic Objects that have a values counterpart, such as equals, hashCode, and toString. In some embodiments, the virtual machine implements such methods component-wise (in the absence of instructions from the author of the value type). Besides Object, other types such as Comparable can also interoperate with suitable value types, opening the door to types such as TreeSet<UnsignedInteger>.

Encapsulation.

In some embodiments, value types have private components, just as objects have private fields. This enables, for example, secure foreign "pointers" or cursors. Value types can be configured so as to prevent would-be attackers from subverting encapsulation by extracting private components or forging illegal values by strained combinations of legal operations.

Verifiability.

In some embodiments, support for value types in the instruction set of the virtual machine 104 is verifiable by the verifier 106.

Variables.

In some embodiments, variable types such as fields, array elements, local variables, and method parameters are all configured to hold value types. Furthermore, methods are configured to return value types. Furthermore, qualifiers (such as final and volatile in Java) can be applied to value types to achieve their regular effect.

Arrays.

In some embodiments, arrays of value types are packed, without indirections, similar to arrays of primitives. This does not necessarily mean that the arrays themselves are packed inside other objects. Thus, the array may hold a flattened representation of the value type elements, but if the array is a field of an object, that object can store a pointer to the array which might be allocated on the heap 302.

Flattening.

Value types provide a natural way to express data structures with fewer pointer indirections. Thus, using value types to flatten data permits the virtual machine 104 to arrange some data structures more efficiently.

3.3 Example Restrictions

Since value types do not have identity, there are certain operations that some embodiments may choose to disallow on value types or to assign a new meaning for use in the context of value types. In some embodiments, the restrictions on value types are implemented in the virtual machine 104 as additional rules for the verifier 106 to follow. Thus, if a method within a class contains code which violates the rules, an exception or error is generated. The following are a few examples:

Locking.

To support synchronization, such as it is performed in the Java language, objects are sometimes used as a lock object of a synchronized statement. In some embodiments, the virtual machine 104 disallows use of value types for such statements, due to the lack of header information expected for this feature. Furthermore, the virtual machine 104, in some embodiments, disallows synchronization related methods from being called on value types. For example, the wait and notify methods in Java.

Identity Comparison.

The "==" operator on objects (in Java) performs an identity comparison, but on primitives the operator performs a bitwise comparison. Since a value type does not necessarily have a pointer, this operator does not apply to value types. In some embodiments, interpreting an operator such as "==" on value types is performed by recursively performing the "==" operation (eventually evaluating based on lower-level objects/primitives), invoking an equals method, and/or performing a bitwise comparison.

Identity Hash Code.

The identity-based hash code for objects, such as via System.identityHashCode in Java, does not apply to value types. Internal operations like serialization, which make identity-based distinctions of objects, either do not apply to value types (as they do not apply to primitives) or else would use the value-based distinction supplied by a separate hash code method defined by the value type. For example, a component-wise hash computation could be reverted to as a default. However, when components of the value type are private this may leak information that could be used by attacks.

Clone.

In some embodiments, the virtual machine 104 interprets cloning, such as the Clone method in Java, as an identity transform for value types.

Finalization.

In some embodiments, Finalization for value types are disallowed, as in many embodiments finalization of the value type would serve no purpose (though value types may hold reference-typed components that are themselves finalizable.)

Many of the above restrictions correspond to the restrictions in Java on so-called value-based classes. In fact, in an embodiment, the boxed form of every value type is a value-based class.

In some embodiments, the virtual machine 104 places a "soft" restriction on value types to ensure the value types are not "too large", in terms of storage space and/or number of components. Since value types are passed by value, the overhead of copying many components is increasingly likely to overwhelm any savings obtained by removing the overhead of a pointer and an object header as the number of components grows. Large groups of component values can alternatively be modeled using classes, since class objects are passed by reference using a pointer.

In some embodiments, a well-conceived use of a value type obtains a performance and complexity benefit by omitting the object pointer and header, and routinely passing the components by value. A value type with a small number of components often neatly matches the capabilities of most present central processing units (CPUs), which have relatively small limits on the size of their register file. When those limits are passed, the virtual machine 104 in some embodiments has the flexibility to spill value types onto a stack (such as virtual machine stack 310/313) and/or managed heap 302 memory.

In some embodiments, the virtual machine 104 switches between passing value types by value or by reference depending on the size of the value type and/or whether the value type is in a container that cannot be modified. This feature is explored in more detail in later sections.

3.4 Pointer Management

When using a flattened representation of a value type, the value type is not accessed by a pointer or such a pointer is hidden from the user within the virtual machine 104 implementation. Thus, even if the virtual machine 104 uses a pointer under the hood, the virtual machine 104 ensures that, from the perspective of a user, value types follow pass by value behavior. In some embodiments, certain additional operations are also disallowed or assigned a new meaning by the virtual machine 104.

Null.

Null is a valid value of every reference type, meaning "no instance". However, in the context of a value type, null may not be applicable, much in the same way null is not typically applicable to primitives in most languages. Thus, in some embodiments, assignment to, and comparison to null for value types is disallowed. However, this restriction would not apply to the boxed form of a value type, where the container object that boxes the value type can hold null values and be compared to null.

Side Effect.

Although a variable containing a whole value can be reassigned to a different value, the individual parts of a value are typically not be subjected to piecewise side effects, as if they were accessed through a pointer to the value. Thus, an integer can be updated from 2 to 3, but in some embodiments the user is restricted to whole value assignments. As a result, the user is not provided with code instructions that can change the lowest bit of 2 to change the value to 3. The most some languages, such as Java, gives in that direction are compound assignment operations like intval I=1. Furthermore, changing the value from 2 to 3 at a first variable would not cause a second variable somewhere else to become 3, as would be the case if both variables pointed to the same memory location where the value was changed. As a result, in some embodiments, the virtual machine 104 prevents (from the standpoint of the user) piecewise side effects. However, although from the perspective of the user the value types appear to be replaced as a whole (as a property of immutability) and do not cause side effects to other variables (as a property of flatness), under the hood the virtual machine 104 can, in some embodiments, perform optimizations which violate this property. For example, although semantically the code behaves as if Point A is replaced entirely with Point B, under the hood the virtual machine 104 may only replace the differing components as a form of optimization. As another example, pointers can be used to minimize copy overhead in cases where the value types are large, provided that semantically the virtual machine 104 prevents side effects, such as by performing this optimization only in cases where the value type cannot change (e.g., is final).

In some embodiments, languages allow value types to be accessed through pointers, up to and including component mutation. In such embodiments, this conceptual complexity assists with native data structures as well as virtual machine 104 data.

Reference Cast.

In some embodiments, like primitives, a value type can be boxed in order to be used as a reference. Thus, in some embodiments, the virtual machine 104 has rules for implicitly boxing and unboxing value types, similar to how Java currently performs boxing and unboxing for primitive values. For example, by automatically converting between int and the corresponding Integer value class based on context.

Pointer Polymorphism.

In some embodiments, objects incorporate run-time type information, methods can be virtual, types can be tested at runtime, and (many) static reference types can point to a range of concrete subclasses at runtime. In such embodiments, the aforementioned features work since a pointer variable, though fixed in size, can refer to data of any size and type. Since value types have no header to carry type information and are designed to be flattened into their containing objects, value types cannot (in some embodiments) be dynamically type tested and cannot be of variable size. As a result, in some embodiments, the virtual machine 104 prevents sub-classing as that feature would be of little use for value types. However, abstract super classes and interfaces, such as the Comparable interface in Java, could still be used since those constructs cannot be separately instantiated. In some embodiments, value types implement a reduced set of header information, instead of no header information, such as including size data to support variable sizes, but not other information such as an identification number (e.g. a memory address of the object) used to implement identity features.

Reflection.

As an extreme case of pointer polymorphism, in languages such as Java, any object can be cast to the top type Object and be inspected for its string representation, its class, its set of fields and field values, and so forth. Since value types in some embodiments do not support superclasses, the virtual machine 104 may disable casting value types and thus also reflection. However, in some embodiments, the methods of a value type can include a method that creates a string representation similar to the string representation generated from Object types.

Atomicity.

A pointer provides an access path to its object which can be changed atomically. Thus, racing threads observe either the old object or the new object, but not a mix of both. By comparison, a multi-field value might be subject to data races in which a mix of old and new field values might be observed by racing threads. This problem of "structure tearing" can sometimes be observed as a corner case with long and double types in current languages, but is more pressing with value types, since it can severely damage encapsulation. In some embodiments, the virtual machine 104 supplies atomicity on request at both type use and type definition sites. This is similar to how languages, such as Java, supply atomicity on request at type use sites with long and double variables being declared volatile. The cost of guaranteed atomicity in present hardware is large enough that requiring atomicity at all times could result in a significant amount of unnecessary overhead for programs which do not require atomicity or which require only certain variables to be atomic. The precise tradeoffs vary across platforms.

3.5 Example Definitions

In some embodiments, several characteristics of value types are common with classes: a collection of named, type components (fields), behavior (methods), privacy (access control), programmatic initialization (constructors), and so forth. Thus, in some embodiments value types are defined using specially marked class files. However, the virtual machine 104 via the verifier 106 can impose special rules on those class files, such as the restrictions described in earlier sections. Similarly, the syntactic elements for value types can be crafted to appear similar to writing classes in the source language.

In some languages, such as Java, there is precedent for taking this approach, such as using class files 103 to represent interfaces since those also share similarities with ordinary classes. Apart from the addition of mode bits and minor syntax, the binary of an interface can, in some embodiments, be identical to that of a proper class, except that interfaces have additional syntactic and semantic restrictions. Similarly, value types can be defined in source code files 101 and written using minor changes in syntax, but with additional restrictions applied by the verifier 106 to the resulting class files 103.

Using an example syntax, the Point example provided earlier can be rewritten as a value type as follows:

```
final __ByValue class Point {
    public final int x;
    public final int y;
    public Point(int x, int y) {
        this.x = x;
        this.y = y;
    }
    public boolean equals(Point that) {
        return this.x == that.x && this.y == that.y;
    }
}
```

The syntactic difference between the above example and the reference equivalent start with the keyword _ByValue marking the construct as a value type rather than a proper class. However, this is only example syntax, any means of marking the construct as a value type is permissible, such as marking by keyword, symbol, or any other syntax. Furthermore, the same coding idioms used for the source language, such as fields, constructors, and/or methods can be reused to add those values/behaviors to the definition of the value type. In some embodiments, the virtual machine 104 or the compiler 102 fills in certain utility methods, such as a component-wise hashCode, equals, or toString, if the user does not provide one in the source code files 101 (and the language allows this omission).

If another class declared a field of type Point, the virtual machine 104 would allocate storage for the x and y components in the hosting object, rather than a reference to a Point box. This can be viewed as object inlining or flattening. Similarly, an array of Points would be laid out as a packed array of alternating x and y values, rather than a series of references to containers storing pairs of x and y values.

In some embodiments, since value types are exposed to users using features and syntax similar to classes, the definition of the value type is immediately clear to programmers of the source language. However, some familiar features which do not apply to value types in various embodiments, such as extends or protected in Java, might not be applicable. Thus, if a user attempts to include those attributes in the definition of a value type, the compiler 102 or the verifier 106 of the virtual machine 104 throws an exception or generates an error.

In some embodiments, the source language already has keywords or other mechanisms that express restrictions, such as the immutability of subfields after construction. For example, the final keyword in Java. Thus, if the user leaves off the final keyword, the compiler 102 may provide an error explaining the keyword is necessary, or implicitly add that keyword to the generated class file. Furthermore, in some embodiments, the virtual machine 104 implicitly adds the final attribute to the generated class file if missing, or treat that attribute as having been set.

3.6 Example Usage

The previous section describes how value types can be coded in the same manner as classes, thus the next issue is how to define behavior in the virtual machine 104 to provide treatment as though the value types were primitives. Some example uses of the Point class follow:

```
static Point origin = __MakeValue(0, 0);
static String stringValueOf(Point p) {
    return "Point("+p.x+","+p.y+")";
}
static Point displace(Point p, int dx, int dy) {
    if (dx == 0 && dy == 0)
        return p;
    Point p2 = __MakeValue(p.x + dx, p.y + dy);
    assert(!p.equals(p2));
    return p2;
}
```

In these examples, a Point can be a field, argument, local variable, or return value. In all those cases, the virtual machine 104, in some embodiments, places the components of the Point into independently managed locations, such as machine registers. The displace method returns a new Point value. In some embodiments, the virtual machine 104 returns the Point by value, rather than by (invisible) reference.

In some embodiments, like primitives, a value type can guide overloading. Here are some overloads for stringValueOf which are compatible with the above:

```
static String stringValueOf(int i) {
    return Integer.valueOf(i);
}
static String stringValueOf(Object x) {
    return x.toString();
}
```

Using Java as an example, the above usages of value types differ from primitives in a number of ways.

First, the dot syntax for member selection applies to value types, as with p.x or p.equals. Primitives in some languages, such as Java, do not support the dot syntax at all. In some embodiments, the value classes which represent primitives (such as Integer) are replaced or supplemented using value types, thus opening the door for applying methods on what in some cases are standard primitives (such as int, float, double, and so forth).

Second, in some embodiments, the virtual machine 104 does not provide support for literals of user defined value types, such as Point. Instead, the constructor of the definition is invoked to set the values of the components. In some embodiments, to ensure encapsulation, component-wise value creation is not allowed by the virtual machine 104 unless provided for by a suitable constructor. The above example uses the keyword _MakeValue to mark the two places above where new point values are created and such a constructor is invoked. However, alternative syntaxes can also be used to signify a value type constructor, such as "new Point", "Point", and the null string. Similarly, some embodiments do not provide support for compile-time constants for value types. In other embodiments, the virtual machine 104 provides support for user defined literals and constant expressions. Thus, in some embodiments user-defined operators are constructed from compile-time code executed to build constant expressions.

Third, built-in operators for some languages, such as Java, are the main way of working with primitives, but in some embodiments these built-in operators do not apply to Points. However, user defined operators can be used to provide the functional equivalents. Some exceptions might be operators which work on every kind of value, such as the relationals (== and !=) and string concatenation (+). String concatenation can be tricky, since in some embodiments string concatenation is subtly overloaded precisely at the distinction between classes and primitives, which is where value types reside. For example, as discovered by many Java programmers by trial and error, the expressions ("a"+1)+2 and "a"+(1+2) have different results, since the first converts to a string first resulting in "a12" and the second converts to a string after the addition resulting in "a3".

In some embodiments, relationals are treated as aliases for an equality method (similar to equals in Java). In addition, low-level bitwise equality is another candidate. However, in some embodiments, relational operators can potentially lead to behavior divergences between the boxed and unboxed form of a value type, as follows using Java as an example:

```
Point p1 = _MakeValue(0, 1);
Point p2 = _MakeValue(1, 0);
Point p3 = _MakeValue(1, 0);
assert(!p1.equals(p2));   // value equality
assert(p1 != p2);   // value equality, again
assert(p2.equals(p3) && p2 == p3);
Object box1 = p1, box2 = p2, box3 = p3;   // box 'em
assert(box1 == box1);   // x==x always (except NaNs)
assert(!box1.equals(box2));  // Object.equals calls Point.equals
assert(box1 != box2);   // must also be
assert(box2.equals(box3));
if (box2 == box3) println("the cat died");   // indeterminate
assert((Point)box2 == (Point)box3);   // back to Point.equals
if (box2 == (Object)p2)   println("the cat died");   //
indeterminate
```

With minor adjustments, all the above tests in Java can be reproduced with int and Integer. However, for some small integer values, the cat never survives due to a peculiarity of the Integer.valueOf factory method, rather than an inherent feature of primitives, value types, or boxes.

Fourth, although primitives do not have values that correspond to the null reference, primitives do have default values, generally some sort of zero. This default value shows up in the initial contents of uninitialized fields and array elements. It is therefore possible to specify a default value for each value type. For example, one technique is set the composite value to be recursively default in all of its sub-fields. Given that predefined default values are a fixture in some languages, such as Java, this convention is applicable to many language contexts.

In some embodiments, the author of methods in a value type definition can provide behavior to default (all-zero-bits) value types, even if the constructors never create them, since those value types might be observed in some uninitialized variables. In an embodiment, the virtual machine 104 either forbids no-argument constructors or requires them to produce default values, in order to avoid "dueling defaults".

In some embodiments, as an alternative, the virtual machine 104 forces explicit construction of default values by mandating the inclusion of a public null constructor, like this: public Point( ){x=0; y=0;}. In the public null construction, all sub-fields are initialized to default values, or the compiler 102 and/or verifier 106 would report an error. Alternatively, the virtual machine 104 could disallow null constructors, and reserve their meaning for default values.

In some embodiments, as an alternative, the virtual machine 104 allows a more elaborate default to be specified through a pattern or syntax imposed on standard class definitions. However, there are three considerations to this (1) in some cases the default would require a special extension rather than a simple restriction, (2) in some cases the default would involve special rules to code with side effects from the null constructor, and (3) applying user-specified defaults at runtime could potentially be more costly than a convention of all-zero-bits.

3.7 Example Implementation Details

In some cases, certain features of classes will not make sense for value types for particular embodiments. The following represents design and/or implementation decisions for value types according to a particular embodiment in question and answer format. However, the answers represented below are not dispositive; other embodiments may provide different answers to the questions presented below. Thus, other embodiments can differ on each issue. In some embodiments, the restrictions on value types described in this section are implemented in the virtual machine 104 as additional rules for the verifier 106 to follow.

Subtyping

Can a value class extend a reference class type? In most cases, no.

Can a reference class extend a value type? In most cases, no.

Can a concrete value class extend another value type? In most cases, no. (Because concrete value classes are final.)

Can a value type definition be abstract or non-final? In most cases, no.

Can a value type definition implement interfaces? Yes. Boxing may occur when we treat a value class as an interface instance.

Can value types participate in inheritance-based subtyping? In most cases, no. (Just like with primitives.)

Is there a root type for values (such as the Object supertype in Java)? Not necessarily. In some embodiments, a value type supertype can be implemented as a templating mechanism.

Containment

Can a value type contain a field of reference type? Yes.
Can a reference class contain a field of value type? Yes.
Can a value type contain a component field of value type? Yes.
Can an array contain elements of value type? Yes. (In some languages, an array is a type of object).
Can a value type contain a field of array type? Yes. (For example, when arrays are objects).

Can a value type contain a non-final field? In many embodiments, no, though other embodiments can allow value types with non-final fields.

Must all fields of a value type be recursively immutable? Not necessarily. (Recursive immutability is an independent feature of types).

Can values types have member types? Yes. (Non-static member types have hidden fields that record containing values.)

Can values be member types? Yes. (If non-static, they have hidden fields that point to containing objects.)

When creating an array of value types, what are the initial elements? They are all the default all-zero-bits value. (Just like with primitives.)

What is the initial value of a field whose type is a value type? The default all-zero-bits value, until the first assignment or initialization.

What is the initial value of a local variable whose type is a value type? Depends, in some embodiments assignment rules forbid observing such a value, until the first assignment.

Can a value type contain a field of its own type? In most cases, neither directly nor indirectly (similar to existing restrictions in some languages where a class cannot subclass itself).

Compatibility

Are value types objects? Not necessarily, although value types can be boxed into objects.

Are primitives value types? Possibly. (Value types named int, boolean, etc., would provide good successors to wrapper classes as they exist in current languages, such as Java).

Are arrays of value types covariant? In most cases, no. (Just like with primitives, arrays of value type boxes are covariant).

Do value types participate in implicit conversions? In most cases no. (In some embodiments, the virtual machine 104 does not need to implement implicit conversions, such as int toUnsignedInteger in Java).

Does every value type define object-like methods (toString etc.)? Sometimes. In some embodiments, the object-like methods are required by the virtual machine 104 so that their boxed forms can interoperate with existing APIs that expects objects, rather than value types. However, the object-like methods are not required in all embodiments.

Are there default component-wise implementations for these methods? Yes. For example, a root type for boxes is a logical place to put default component-wise code.

Can value types be serialized? Depends. In some embodiments, in order to prevent encapsulation to be violated, the virtual machine 104 does not implement serialization for value types. However, in other embodiments, the virtual machine 104 can implement serialization for value types.

Can the user of a value type request atomicity? Yes. In some embodiments, atomicity can be specified using a keyword, such as the keyword volatile or _AlwaysAtomic.

What happens when a value type is assigned to generic Object? The virtual machine 104 automatically boxes the value type into a virtual machine 104 generated class based on the class file of the value type. The generated class file mirrors the fields and methods of the value type, but generated objects contain header information and thus can be used for identity and for interoperability with APIs expecting objects.

What happens when null is assigned to (or compared to) a value type? If the value type is boxed, a reference comparison will return not-equal; if the value type is unboxed, an exception thrown.

Encapsulation

Can value types have nonpublic fields? Yes.

Can value types have nonpublic methods? Yes.

Can values have static methods or fields? Yes.

How are value types constructed? By calling a constructor. Value type constructors are really factory methods, so (using JVM bytecode as an example) there is no new;dup; init dance in the bytecodes.

Can the definer of a value type demand atomicity for all its component values? Yes. For example, through use of keywords or symbols in the value type definition indicating that operations will always be atomic.

Can the encapsulation of a value type be arranged to exclude all default componentwise operations? Yes. (For example, by overriding the relevant methods).

Can a value type change size or layout without requiring clients to recompile? Yes.

Can the encapsulation of a value type be arranged to exclude values all of whose fields are zero? In most cases, no. (As noted above, a deliberate compromise. The default value in some embodiments can be reconciled with the no-argument constructor value, as noted above.)

Can virtual machine instructions, such as bytecodes, be used in a way to access private fields of a value type? Depends on the embodiment.

Other Details

Is there a limit on the complexity of value types? Yes. In some embodiment, the virtual machine 104 imposes a limit on the number and/or size of components of a value type in order to make performance guarantees. For example, (But not low enough to make performance guarantees. For example, value types could be limited to a threshold value such as 255 words.

Does the virtual machine 104 support refactoring a value type by splitting out a superclass? In most cases, no, unless the virtual machine 104 allows abstract value types.

Does the virtual machine 104 support refactoring methods into and out of value types? Yes, for example, common interfaces with default methods could be used for this purpose.

Does the virtual machine 104 support calling methods of value types on boxed values? Yes. In some embodiments, the virtual machine 104 automatically boxes and unboxes values to create bridges for the APIs. For example, when a Point is used, the representation will sometimes be the value type and sometimes be the box reference type, depending on the context and the environment.

In some embodiments, the virtual machine 104 prohibits subclassing and subtyping of value types to avoid pointer polymorphism. Abstract super types (like the interface Comparable in Java) can be considered because they cannot be instantiated. As a result, the virtual machine 104 can therefore ensure that all methods are resolved unambiguously in the exact type of the method receiver. In some cases, this decision also sidesteps a problem with arrays of value types, which can involve variable-sized elements if an array could contain (for example) both 2-fieldPoint and 3-field Colored-Point values. For arrays, it is convenient to lean on primitive semantics since primitive arrays already have completely homogeneous elements. However, this approach is not without issues. For example, for a value type Bignum that implements Comparable, the virtual machine 104 may allow an array of boxes Bignum._BoxedValue[ ] to be a subtype of the interface array Comparable[ ], but the flat array type Bignum[ ] cannot also be a subtype of Comparable[ ] in some embodiments.

3.8 Example Bytecodes and Type Descriptors

There is a multitude of ways that value types can be surfaced in the instruction set (e.g. bytecodes) of the virtual machine 104. For example, all-new instructions for value types can be implemented, treating value types as an entirely new construct, or overload existing instructions to accept either value types or references. This section focuses on new instruction that can be implemented to generate, load, store, and/or otherwise manipulate value types. However, as mentioned above, other embodiments may overload existing instructions to achieve similar effects.

Building on the descriptor examples discussed above in "Example Class File Structure", there are single-letter type descriptors for primitives (e.g., I for int), "L" descriptors for classes (e.g., L ClassName), and for any type, the type descriptor can be derived for an array of that type by prepending a "[". In an embodiment, another form is added for value types; the type descriptor for a value type com- .foo.Bar would be Q com/foo/Bar; which is just like the "L" descriptor for reference types, except with a different symbol "Q". For example, consider the following method:

public static double getR(Point p) { ... }

The signature for the method above would be (Q Point) D, indicating it took a single argument of value type Point and returned a double.

Examples of new virtual machine 104 instructions are described in the following format:

```
// Description
opcode [ constant pool operands ] stack operands -> stack result
```

In some embodiments, for all opcodes, a "qdesc" is a Q-descriptor for a value type. However, for many instructions, the verifier 106 can infer the descriptor from the context of the instruction. Thus, some embodiments may choose to omit such descriptors from the instruction if they can instead be inferred by the context. Table slots for the local variables 401 and slots for the operand stack 402 can hold value types as well as primitives or references.

In some embodiments, value types consume a single slot in the local variables 401 and/or the operand stack 402. As a result, each slot does not have to be of a fixed length size. However, in other embodiments, value types consume multiple slots, similar to how in some JVM implementations oversized primitives, such as doubles, are designed to take up two slots instead of one, leaving slots free to be of equal size. In some embodiments, the virtual machine 104 can change the size and layout of the slots without recompiling the code. Additional details regarding the storage of value types within the virtual machine memory layout 300 is discussed in later sections.

In an embodiment, the virtual machine 104 supports the following instructions for manipulating value types on a stack frame 400. Again, while some of the forms in the following examples are arguably unnecessary, the examples err on the side of explicitness and completeness. Thus, in some embodiments, the number of new instructions can be far less than the number of new instructions described below.

```
// Load value type from local variable
vload [ qdesc?, index ] -> value type
// Store value type into local variable
vstore [ qdesc?, index ] value type->
// Create new array of value types
vnewarray [ qdesc ] size -> arrayref
// Store value type into array
vastore [ qdesc? ] arrayref, index, value type ->
// Load value type from array
vaload [ qdesc? ] arrayref, index -> value type
// Extract a component from a value
vgetfield [ field-desc ] value type -> result
// Insert a component into a value type (for private use by
   constructors)
vputfield [ field-desc ] value argument -> value type
// Construct a fresh value type with all default components (for
   use by constructors)
vnew [ qdesc ] -> value type
// Invoke a method on a value type
vinvoke [ method-desc ] value type, (argument)* -> (return)?
// Return a value type
vreturn [ qdesc? ] value type
```

In some embodiments, the virtual machine 104 supports a number of "polymorphic" instructions, such as "dup" in the JVM bytecode set, that can operate on frame 400 contents of any type; these would be extended to support value types as well. In most cases, these polymorphic instructions can be overloaded onto existing instructions with minimal effort. Using the JVM bytecode set as an example, vinvoke functionality may be overloaded onto invokestatic and the vgetfield functionality may be overloaded onto getfield.

In some embodiments, the field and method descriptors referred to above would be constant table 201 references, such as references referring to method reference structures 207, field reference structures 206, and/or class information structures 203. In some embodiments, components of the descriptors refer to the value types by their normal names (e.g. without any "Q" prefix). The boxed forms of the corresponding class have their own bytecode name, e.g., derived from the descriptor language (e.g., L Foo). In some embodiments, the virtual machine 104 supports cloning constant table 201 types, such CONSTANT_ValueMethodref, using Java class files as an example.

In some embodiments, static methods in value types reuse the same instructions implemented for proper classes, without the need for a special instruction directed specifically to value types. For example, using the JVM bytecode set as an example, static methods in value types can be invoked using invokestatic. In some embodiments, static fields, similar to static methods, can reuse the same instructions for manipulating static fields implemented by the virtual machine 104 for manipulating static fields of proper classes.

In some embodiments, the virtual machine 104 prevents constructor invocation from passing the value type to be constructed by reference. Instead, value type constructors are implemented as static factory methods which will be invoked as static methods. Individual mutation steps for component initialization are represented, internally to the constructor, by use of the privileged instruction vputfield, which operates equivalently to the special instruction reserved for constructors which initialize final fields of a property object, such as putfield in JVM bytecode. Note that vputfield returns the updated value, thus there is no chance of a side effect occurring.

In some embodiments, the virtual machine 104 combines the effects of the vnew and vputfield operators, as used by constructors, into a vpack instruction, which would take a series of components on the stack. The order and type of those components would be implicitly defined by the containing value type definition. This would make some simple constructors slightly more compact, but may result in a new kind of coupling between an instruction and its containing class being implemented in the virtual machine 104. In some embodiments, the virtual machine 104 operates on composites as clusters of named fields, rather than on ordered tuples of stacked values. In some cases, the correspondence between virtual machine 104 instruction and source code can be simpler to track, if each field initialization has its own vputfield opcode.

In some embodiments, while generating lower-level instructions from higher-level instructions, one or more higher-level instructions that change a field within a value of a certain value type may be identified. The value may be, for instance, an instance of a value type, potentially having multiple different component fields. Examples of such value types, such as Point or Complex, are described herein. It may be determined that, within the context of the lower-level instructions, data for at least one component field of the value are to be stored collectively within a single container. For instance, the field may be stored as an unboxed representation of its corresponding subvalue, as opposed to a reference to other container(s) which store the corresponding subvalue. Responsive to this determination, a single lower-level instruction is generated. One example of such a lower-level instruction is the vputfield instruction described herein.

In some embodiments, the single lower-level instruction that is generated is configured to instruct the interpreter 108 to identify a portion, such as one or more bits, of the container that correspond to the field. The single lower-level instruction is further configured to instruct the interpreter 108 to change the portion, in accordance with the one or more higher-level instructions. The identification and/or changing may be based at least partially on metadata associated with the value type of the value. For instance, the instruction may cause the interpreter 108 to use field definitions for the value type to locate the portion, and/or to enforce access control information, type checking, and so forth for the corresponding value type definition. In an embodiment, the single lower-level instruction instructs the interpreter 108 to do this without the use of pointers to locate the fields, and/or without having to issue a separate instruction to open up the value into its component fields.

In an embodiment, the lower-level instructions are optionally generated by reordering, merging, or separating the effects of two or more such lower-level instructions relative to each other and relative to any other instructions which may read or write the value stored in a container, or at least some of the component fields of the container. This reordering, merging, or separation of effects may be subject to rules which protect the consistency of each component field of a value stored in a container, as well as the value as a whole stored in a container. Hence, the techniques may involve using a nested memory model of data structures that are hierarchical, as objects split into values, which may split into smaller values, and which eventually split all the way down to components primitives and references.

According to an embodiment, a method comprises: while interpreting instructions, such as Java bytecode, that identify an instruction to insert a first and smaller value as a field of a second and larger value. The instruction may be, for instance, a single lower-level instruction such as generated above. The second value may be, for example, a value of a defined value type having multiple different component fields that are collectively stored in a container. The first value may be, for example, a sub-value corresponding to a field. In an embodiment, it is determined that the second value is of a certain value type. Based on metadata associated with the certain value type, a portion of the second value that corresponds to the field is located, and the first value is loaded into the portion. This may comprise, for instance, enforcing access control information and type checking based on value type definition data associated with the certain value type, and/or using the value type definition data to locate the relevant portion. In an embodiment, the lower-level instructions are optionally generated by reordering, merging, or separating the effects of two or more such lower-level instructions, such as described above.

3.9 Boxing and Object Interoperability

In an embodiment, every value type has a corresponding box class, just as Integer is the box type for int in Java. In some embodiments, rather than requiring separate coding of the value type and its corresponding box, the virtual machine 104 or the compiler 102 automatically derives the class file for the box class for a value type from the definitions provided in the class file for the value type (or vice versa). For example, the methods and fields can be ported over from the class file of the value class, but with the box class file containing identifiers indicating the virtual machine 104 should interpret the box class file as referring to a proper object class. The box class file can also contain additional metadata that may not be present in the class file for the value type, such as presence of a superclass (e.g. Object superclass in Java). Alternatively, the virtual machine 104 can generate one class file which is generic to both the value type and box representations, with the class file being processed differently by the virtual machine 104 depending on the context. For example, if the value type uses the descriptor "Q Foo", the descriptor for the corresponding box class can be "L Foo". For both types, the virtual machine 104 will know to look for a class file called Foo and generate a value- or reference-view based on which descriptor is used.

In some embodiments, common operations, such as construction, have different mechanics for value types or box classes. For example, the compiler 102 might generate multiple versions of class artifacts (e.g., a standard constructor with signature ( . . . ) V and a value constructor with signature ( . . . ) Q Foo or the virtual machine 104 will derive one from the instruction of the other as needed. In some embodiments, for a value type Foo, Foo can be written to refer to the value form and Foo._BoxedValue to refer to the boxed form of Foo.

In an embodiment, the conversions between the boxed and unboxed representations of value types are represented by methods following a naming convention, as they are with the current primitive boxes in some languages such as Java (e.g., valueOf(boxed)) or might be represented by conversion instructions like these:

```
// Box a value
v2a [qdesc] value -> ref
// Unbox a value
a2v [qdesc] ref -> value
```

Comparisons between values (analogous to acmp and icmp bytecodes in the JVM bytecode set) might also be represented by methods following a naming convention, or with special instructions like these:

```
// Compare two values using componentwise, bitwise and reference
equality
vcmp [ qdesc? ] value, value -> boolean
```

In some embodiments, although it useful in some cases to process the "cloning" of new value type instructions like those which manipulate primitives and references, the conversion and comparison instructions can, in an embodiment, be implemented using a method call (e.g. vinvoke).

In some embodiments, box classes, like arrays, are generated by the virtual machine 104. In an embodiment, the system factors box code, as much as possible, into a common abstract superclass. In Java, this is approximately the approach taken for classic objects, where the default behaviors are found in java.lang.Object.

2.10 Example Code

Example: Construction

In this section examples of creating and using value types are described using a combination of the new instructions introduced above in "New Bytecodes and Type Descriptors" and instructions from the JVM bytecode set. Although JVM bytecode is used to provide examples, the techniques described by the examples are not limited to Java, the JVM, or any particular language or virtual machine architecture.

In some embodiments, objects are initialized by first executing an instruction which creates an uninitialized object, and then invoking the constructor. Constructors for value types behave more similarly to factory methods. The following shows the example instructions generated for the constructor of Point.

```
value class Point {
    public int x;
    public int y;
    public Point(int x1, int y1) {
        ; public static <new>(II)QPoint;
        //implicit: initialize 'this' to all-zero-bits
        ; vnew           // stack holds [ this ]
        this.x = x1;
        ; iload 0 ('x1')   // stack holds [ this x1 ]
        ; vputfield 'x'    // stack holds [ this ]
        this.y = y1;
        ; iload 1 ('y1')   // stack holds [ this, y1 ]
        ; vputfield 'y'    // stack holds [ this ]
        //implicit: return 'this'
        ; vreturn
    }
}
```

To create an instance of a Point in the local variables 401 of the stack frame 400, the factory method is invoked, and the result stored in the local:

```
Point p = new Point(1, 2);
    ; iconst_1
    ; iconst_2
    ; invokestatic "Point.<new>(II)QPoint;
    ; vstore 6 (create 'p')
```

In the above example, to simplify exposition, the name of the constructor of a value type is changed to <new>, to emphasize that it is a factory method.

Example: Nested Values

```
final __ByValue class Path {
    final Point start;
    final Point end;
}
class Foo {           // regular class
    Path path;        // regular field
}
int startX = path.start.x;
    ; aload 0 ('this')      // stack holds [ Foo ]
    ; getfield Foo.path     // stack holds [ path ]
    ; vgetfield Path.start  // stack holds [ start ]
    ; vgetfield Point.x     // stack holds [ x ]
    ; istore 1              // stack holds [ ]
```

In the above example, when a nested value is read, its enclosing values are read first.

Example: Arrays

In an embodiment, arrays are created with the vnewarray instruction, and manipulated much like any other array type. The following is an example:

```
Point[ ] points = new Point[100];
    ; bipush 100
    ; vnewarray Point
    ; astore 1 (create 'points')
points[3] = new Point(2, 19);
    ; aload 1 ('points')
    ; iconst_3
    ; iconst_2
    ; bipush 19
    ; invokestatic "Point.<new>(II)QPoint;
    ; vastore
```

Example: Method Invocation

In an embodiment, methods on value types are resolved statically. The invokestatic instruction would be sufficient (as a instruction/bytecode syntax) for invoking both static and non-static methods of a value type, but for clarity of exposition some embodiments use a new invocation instruction vinvoke for non-static methods of value types. The following is an example:

```
class Point {
    public final int x;
    public final int y;
    public double getR( ) {
        double dx = x, dy = y;
        return sqrt(dx*dx + dy*dy);
    }
}
Point p = ...
    ; vstore 1
double r = p.getR( );
    ; vload 1
    ; vinvoke Point.getR( )D
    ; dstore 2
```

Example: Boxing

In some embodiments, when a value type is assigned a variable of type Object, its box type, or an interface type which it implements, the contents of the variable are automatically boxed by the compiler 102 and/or the virtual machine 104. For example:

```
Object[ ] array = ...
Point p = ...
array[1] = p;
    ; aload 1       // array
    ; iconst_1      // index
    ; vload 2       // p
    ; vinvoke Point.<v2a>( )LPoint;    // box p
    ; aastore
Point p = ...
    ; vstore 1
Point._BoxedValue bp = p;    // descriptor LPoint; not QPoint;
    ; vload 1
    ; vinvoke Point.<v2a>( )LPoint;    // box p
    ; astore 99    // continued below...
```

Example: Unboxing

In an embodiment, when a value type is assigned from a variable of type Object, its box type, or an interface type which it implements, the reference is first checked to see if it is the corresponding box type, and (if so) then the value is unboxed. The following is an example:

```
Object[ ] array = ...
Point p = (Point) array[1];
    ; aload 1      // array
    ; iconst_1     // index
    ; aaload
    ; checkcast LPoint;
    ; invokevirtual Point.<a2v>( )QPoint;    // unbox array[1]
    ; vstore 2     // p
Point p2 = bp;
    ; aload 99     // bp; see above
    ; invokevirtual Point.<a2v>( )QPoint;    // unbox bp
    ; astore 5
```

In some embodiments, a boxed reference has methods of the value type invoked directly on it, for example:

```
double r = bp.getR( );
    ; aload 99     // bp; see above
    ; invokevirtual Point.getR( )D
    ; dstore 3
```

Example: Flattened Hash Table

In some embodiments, because value types are pointer-free, value types can be used to flatten some data structures by removing levels of indirection. Flattening not only removes dependent loads from critical paths, but also (typically) moves related data onto the same cache line.

In some cases, a well-tuned resizable hash table can answer a query in not much more than two cache line references, one reference to consult the table header about table size, and one reference to probe an entry in the table. This can be achieved if the table entries are flattened within the data array carrying the table, and this becomes possible with the help of value types.

```
class ToStringIntHashMap {
    private static final _AlwaysAtomic _ByValue class Entry {
        final int key;
        final String value;
    }
    private Entry[ ] table;
    private Entry getEntry(int k1) {
        int idx = hash(k1) & (table.length−1);
        Entry e1 = table[idx];
            ; aload_0         // this
            ; getfield table  // this.table
            ; iload_2         // idx
            ; vaload          // table[idx]
            ; vstore_3        // e1
        int k2 = e1.key;
            ; vload_3
            ; vgetfield key   // e1.key
            ; istore_4        // k2
        if (k1 == k2)   return e1;
        {... else slow path ...}
    }
}
```

The above code actually touches three cache lines, in order to extract an array length from the array header. Fixing that, in some embodiments, involves hoisting the array length up into hash table header.

The above code sidles around the problem of distinguishing a default-valued entry (zero hash, null string reference) from a failure to find an entry. This is a typical issue in adapting pointer-oriented algorithms (e.g. in Java) to value types. This may be addressed in a number of ways by different embodiments. One way is to introduce a value which expresses an optional Entry (entry plus boolean), and return that from getEntry. Note that the ability to make a default (null) Entry value can be useful here, at the end of the slow path for getEntry. Default values are part of some languages landscape (such as Java) for reasons given above.

The effect of the _AlwaysAtomic keyword in the above example is to ensure that array elements values are read consistently, without internal races. Without that modification, on some platforms, structure tearing might lead to states where a value might be associated with the wrong key. This hazard comes from flattening; it is not present in the "pointer rich" version of the data structure.

In some embodiments, the computing platform is able to implement atomicity for this data structure without extra cost, by means of 64-bit memory references. This assumes that the value component can be packed into 32 bits, which is usually the case. In some cases, even a value of four components may fit into 128 bits, and most hardware platforms provide atomic 128-bit reads and writes, at a reasonable cost. For larger values, say with five or more components, the costs for atomicity will go up sharply, which is why atomicity is not the default.

Note that this example data structure is "hardwired" to work on ints and Strings. A corresponding generic class would gain some benefits from the flattened array, but may not work directly on unboxed ints. In some embodiments, the virtual machine 104 implements a template-like mechanism to parameterize over non-references to resolve this issue.

Example: Comparison

As noted above, in some embodiments value types can implement interfaces. it is. Here is an example of a value type which supports comparison:

```
final _ByValue class Bignum implements Comparable<Bignum> {
    private final int intValue;
    private final BigInteger bigValue;
    public Bignum(int n) { intValue = n; bigValue = null; }
    public Bignum(BigInteger n) {
        if (fitsIn32(n)) { bigValue = null; intValue = n.intValue( );
    }
        else       { intValue = 0;    bigValue = n; }
    }
    public int compareTo(Bignum that) {...usual stuff...}
}
```

The automatically created box class properly implements the interface, bridging to the given compareTo method. A vinvoke instruction can also directly invoke the compareTo method as written.

Here are some examples of calls to the interface function.

```
Bignum bn1 = _MakeValue(24), bn2 = _MakeValue(42);
    ; bipush 24
    ; invokestatic Bignum.<new>(I)QBignum;
    ; vstore_1      // bn1
    ; bipush 42
    ; invokestatic Bignum.<new>(I)QBignum;
    ; vstore_2      // bn2
int res = bn1.compareTo(bn2);
    ; vload_1       // bn1
    ; vload_2       // bn2
    ; vinvoke Bignum.compareTo(QBignum;)I
    ; istore_3      // res
Comparable box = bn1;
    ; vload_1       // bn1
    ; vinvoke Bignum.<v2a>( )LBignum;
    ; astore_4      // box
res = box.compareTo(bn2);
    ; aload_4       // box
    ; vload_2       // bn2
    ; vinvoke Bignum.<v2a>( )LBignum;
    ; invokeinterface Comparable.compareTo(Ljava/lang/Object;)I
    ; istore_3      // res
res = bn1.compareTo((Bignum)box);
    ; vload_1       // bn1
    ; aload_4       // box
    ; checkcast Bignum._BoxedValue
    ; invokevirtual Bignum.<a2v>( )QBignum;   // unbox
    ; vinvoke Bignum.compareTo(QBignum;)I
    ; istore_3      // res
```

As with classes, there is often an option to make a direct, non-interface call (vinvoke in this case) to the method which implements the interface.

In the above example, the interface takes an erased Object parameter (such as in accordance with current rules of Java). In the context of the value type, the type parameter (T in Comparable<T>) is allowed to bind to the value type Bignum and thus bridge the box method through to the method compareTo.

In some embodiments, every value type implements an ad hoc interface or abstract super type, such as the following example:

```
interface _Objectable<ThisType> {
    default String toString( ) {...}
    default int hashCode( ) {...}
    default boolean equals(ThisType) {...}
}
```

2.11 Additional Example Options

Subtyping.

In some embodiments, the virtual machine 104 creates a new root type for value types to support abstract value super-types for factoring.

Erasure Vs. Specialization.

In an embodiment, boxes operate only on boxes, and value types only on value types. Certain bridge methods are automatically generated by the virtual machine 104 (statically or dynamically).

Component-Wise Methods.

In some embodiments, component-wise methods are the default. For example, an overly chatty toString method can drastically violate encapsulation of secret value components. The mechanism and policy for generating component-wise methods for printing, comparison, hashcode, etc. may be balanced for the right mix of opt-in vs. opt-out.

Enhanced Variable Operations.

In some embodiments, compare and swap (CAS) and similar operations are addressed as part of a separate feature exposing CAS operations directly. In some embodiments, Value types mesh into CAS and similar operations along with references and primitives, in many cases.

Value/Primitive Convergence.

In an embodiment, primitives are integrated into the value types (e.g. _ByValue class int { . . . }), and become predefined value types.

Fieldwise Side Effects.

In some embodiments, for simplification, value fields are made final. However, in other embodiments, the value fields may not necessarily always be final. One may, in some embodiments, side-effect just one field in a value, thus achieving all the efficiency of "by value" and all the mutability of "by reference".

Generics Over Values.

In some embodiments, the virtual machine 104 supports generics (e.g. List<Point>) for value types.

Array values. The space of aggregates forms a 2×2 matrix: {identity, identityless}×{homogeneous, heterogeneous}. Objects and arrays fill out the "identity" row; value types fills in the (identityless, heterogeneous) box; the remaining box may be described as arrays value. In some embodiments, the virtual machine 104 provides support for arrays value.

2.12 Migration of Types to Value Types

In some operating environments, such as Java, many previously implemented type likely should have been value types had those types been available at the time have been value types if the facility had been available at the time they were written (e.g. LocalDateTime, Integer, etc. in Java). In some embodiments, the virtual machine 104 supports the ability to implement the aforementioned types as value types while maintaining API interoperability.

Migration compatibility has two significant aspects: binary compatibility (what happens when existing binaries refer to the pre-migrated type) and source compatibility (what happens when recompiling files against migrated types). Source compatibility generally requires that every operation on a reference type have a compatible meaning when that type is migrated to a value type; this includes not only value-safe idioms like construction and method invocation, but also value-unsafe operations such as locking, since existing code might perform identity-dependent operations.

Say that pre-existing type 'WasARef" is migrated to a value type, and is annotated by the migration as:

_Migrated _ByValue class WasARef { . . . }

Compatibility is aided by the fact that, if a class 'X' is migrated from a reference type to a value type, the type descriptor 'L X;' is still a valid type after the migration, referring to the boxed form of the now-value type. A discussed above, a class file for the boxed version of the value type can be generated from the class file of the value type, or both may share a common class file. Thus, as long as the naming convention are maintained, previous uses of the value type that result in type unsafe operations or uses can utilize the boxed version of the value type instead. Thus, to provide source-compatibility for migrated types, in some embodiments the virtual machine 104 addresses all of the value-unsafe operations, at least for migrated value classes by providing bridge methods bridging from the 'L' to 'Q' forms so that recompiled APIs continue to work with old clients.

2.13 Updating a Value of a Field

In an embodiment, the virtual machine 104 is configured to use an alternative design of instructions for issues that may arise when updating one field and some *other* field is volatile:

```
value class kludge {
    volatile int flag;
    int baz;
}
```

For example, if the code appears as:
kludge k;
    k.baz=7;
then under the theory that the statement is a synonym for
k=kludge(k.flag, 7);
the "flag" field may be written. In an embodiment, the virtual machine 104 provides support for a "value-like" structure with two volatile fields that can be independently written. However, to compensate, the source language may implement more elaborate semantics at the language level. For example, the source language may follow a rule such as, "a field of a value type is a variable if and only if the value type is the value of a variable." Thus, if the following statement were valid,
c.im=7;
but not
myComplexHashMap.get(key).im=7;
As long as complex values in variables are kept when updating their fields, then a coder can efficiently move back and forth between using a value class and a non-value class for complex numbers.

Meanwhile, virtual machine 104 instructions that are capable of writing each of two (possibly volatile) fields of a value independently can be provided. Thus, in some embodiments, the following technique: add no new virtual machine 104 instructions to those introduced above, but generalizes the "desc" that is part of a vstore or vastore instruction from
Q-descriptor
to
Q-descriptor (. field-name)*
as a result, the descriptors can describe not only a value type but any field or subfield of that value type.

Under this approach, an example way to compile
c.im=7;
is
bipush 7
vstore "Qcomplex;.im" 3
And an example way to compile
c.im *=trouble( );
is
vload 3//c
vgetfield "Qcomplex;.im"
invokewhatever "trouble"
mul
vstore "Qcomplex;.im" 3
Thus, if vload and vaload were extended (and possibly vreturn and vgetfield and vputfield) to take these extended descriptors (might as well, for symmetry), then it becomes:
vload "Qcomplex;.im" 3
invokewhatever "trouble"
mul
vstore "Qcomplex;.im" 3
And if p is a variable of value type "foo" that has a field of type complex named "phase", then an example way to compile
p.phase.im *=trouble( )
is
vload "Qfoo;.phase.im" 4
invokewhatever "trouble"
mul
vstore "Qfoo;.phase.im" 4
which is, in some aspects, more efficient than a vputfield/dup_X1 dance. The justification for packing what appear to be chained field accesses into a single descriptor is that, after all, it's just a descriptor; it resolves to a single offset and a vload or vstore that uses it is performing, in some embodiments, just one read or write operation to memory.

In some embodiments, type checking compensates for the above described technique. For example, for vload "Qfoo;.phase.im" 4, the type of the quantity in local variable slot 4 must be Qfoo;, but what is loaded onto the stack has type equal to the type of the subfield.phase.im, which is double or int, depending on the implementation of the complex number.

4.0 Modified Loading Procedure

In some embodiments, the virtual machine 104 modifies the loading procedure described above in "Loading, Linking, and Initializing" to compensate for the introduction of value types. This section describes a few example ways in which the technique can be modified. However, the examples apply only to particular embodiments and are not dispositive.

As described above, when a class file 200 is loaded into the virtual machine memory layout 300, memory is allocated for the static fields of the loaded class. In the event that a static field of a class is of a value type, then in some embodiments, the amount of space that needs to be allocated is located in the class file for the value type rather than the class file for the current class. As a result, the virtual machine 104 locates the class file of the value class based on the symbolic reference specified for the field in the class file of the class that is being loaded and calculates the amount of memory required. Although, if the class file for the value class has already been loaded, the virtual machine 104 could perform the calculation and cache the result in metadata associated with the value class that indicates the total size. This metadata could then be read by the virtual machine 104 instead of performing the calculation multiple times. For example, the amount of space that needs to be allocated by the virtual machine 104 in the shared area 301 for that field would be the sum of the component parts of the value type. This is with the caveat that if a value type has a field of a value type (assuming the embodiment allows such a field), the calculation of the memory required is performed recursively, summing up the totals.

Similarly, if an instance of the loaded class is created on the heap 302, the amount of space required for an instance field holding a value type can be calculated in the same fashion. Alternatively, this calculation can be performed ahead of time and cached as metadata associated with the value type and/or the object class to prevent the virtual machine 104 from having to perform the calculation each time the object class is instantiated.

5.0 Storage Considerations

As discussed above, value types are intended to be stored using a flattened representation and passed by value. Thus, when an object is created on the heap 302 that holds a value type, the contents of the value type are stored within the object, as opposed to a reference to a value type allocated in a separate area on the heap 302. Furthermore, when a value type is loaded into a stack frame 400, the contents of the value type are copied into the local variables 401 and/or operand stack 402, rather than a reference.

In some embodiments, the local variables 401 represent a data structure holding one or more "containers", such as an array holding a number of slots in which to store individual values for the local variables 401. One technique to allocate space for local variables 401 is to allocate containers of a fixed size. For example, the virtual machine 104 may allocate an array where each slot is sized to fit a primitive or reference. Thus, primitives are stored by value in the slot and non-primitives are allocated on the heap 302 with a reference into the heap 302 stored in the slot. In some cases, primitives representing a multiple of other primitives, such as doubles, are treated as taking up multiple slots. However, value types are defined by users and thus can be of variable sizes which might not fit neatly into fixed sized containers.

In some embodiments, such as when the JIT compiler 109 takes over and compiles the virtual machine 104 instructions in one or more methods being executed, a global analysis of the code is performed. As a result, the virtual machine 104 can determine the container sizes that will be required to execute a particular compiled method. However, when using the interpreter 108, the virtual machine 104 executes the program one instruction at a time without the benefit of a global analysis. As a result, the containers for the local variables 401 that are allocated when a stack frame 400 is created (e.g., as a result of a method invocation), could be insufficiently sized to handle a particular value type. For example, assume the local variables 401 comprise two containers, each allocated with 64-bits of memory. If the virtual machine 104 instructions of a given method specify to store a smaller value, such as an int, into the first container, the memory allocation may be inefficient (more space allocated than necessary), but the int could be stored in the container. However, if the virtual machine 104 instructions specify to store a 128-bit value type in the container, the container would not be large enough to accommodate the value type. In response, the virtual machine 104 would reallocate the container to 128-bits in order to store the value type. Thus, there is a storage overhead associated with oversizing the containers used to store the local variables 401 and a processing overhead associated with undersizing the containers and performing frequent reallocations.

In some embodiments, the operand stack 402 is also implemented as a data structure storing one or more containers. For example, the operand stack 402 can be implemented as a stack or segmented stack that stores one or more containers that are accessed in a First-In First-Out (FIFO) order. Thus, in some embodiments, storing value types into the operand stack can result in the same issues discussed above in relation to the local variables 401.

In some embodiments, the virtual machine 104 implements allocation rules and storage optimizations that reduce the overhead associated with storing variably sized values, such as value types, in containers.

5.1 Storage Process Flow

Figure 5:
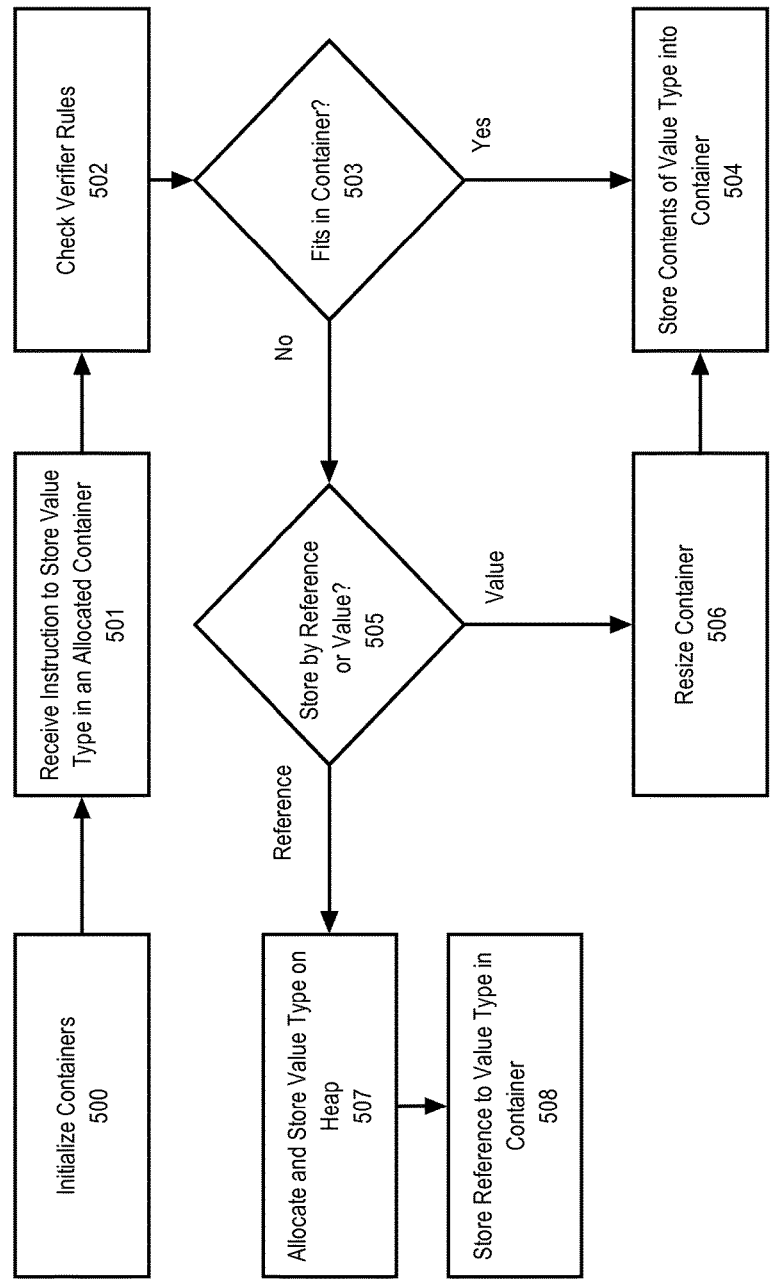
FIG. 5 illustrates a process for storing a value type in a container according to an embodiment.

FIG. 5 illustrates a process for storing a value type in a container according to an embodiment. As discussed above, both the local variables 401 and the operand stack 402 can be implemented as data structures storing containers. However, the process flow illustrated in FIG. 5 is generic to the data structure used to store the containers. Furthermore, the order in which the blocks are performed in FIG. 5 is not critical. In other embodiments, the blocks can be rearranged, merged, or divided out into separate blocks compared to the illustration of FIG. 5. The following explanation assumes that the process flow of FIG. 5 is performed by the interpreter 108 of the virtual machine 104. In addition, the following explanation assumes that frame 400 is the current stack frame during the process of FIG. 5.

At block 500, the interpreter 108 initializes one or more containers. In some embodiments, block 500 is performed when creating a new stack frame 400 in response to a method invocation. For example, the one or more containers may represent a data structure for storing the local variables 401 and/or a data structure for storing the operand stack 402.

In an embodiment, the interpreter 108 initializes the one or more containers to be of the same fixed size. For example, the interpreter 108 could initialize the containers to be the size required to store basic primitives and/or a reference. As another example, the interpreter 108 could create containers that are of a fixed size greater than a basic primitive and/or reference.

In some embodiments, the interpreter 108 initializes the one or more containers to sizes that are variable. For example, in some embodiments, when a method is invoked a new stack frame 400 is created and the arguments on the operand stack of the previous frame are popped and placed in the local variables 401 of the new stack frame 400. Thus, at least for the containers used to store the arguments, the interpreter 108 can initialize those containers to sizes appropriate for the argument types expected for the method invocation, such as primitive types, reference types, or value types. For example, the interpreter 108 could determine the argument types by inspecting the descriptor of the method call.

However, in some embodiments, the stack frames overlap in memory to promote storage efficiency. For example, the stack frame of the caller can overlap in memory with the stack frame of the callee, resulting in the operand stack of the caller being the same memory location as one or more local variables of the new stack frame. In such embodiments, the containers for local variables 401 representing the arguments are initialized when the caller pushes those values onto the operand stack of the previous frame.

In some embodiments, the interpreter 108 could still require containers for variables declared within the body of the method (e.g. non-argument local variables). In some embodiments, the interpreter 108 pre-allocates a number of containers to hold values for such variables. However, in other embodiments, the interpreter 108 holds off the initial allocation until an instruction is received to store a value into the local variable. Once the instruction is received, the interpreter 108 allocates a container that is large enough to store that value. For example, containers may be indexed by number (1, 2, 3, 4, and so forth), if an instruction is received to store a value at an index number for a container which has not yet been allocated, the interpreter 108 allocates a container large enough to hold that value. In some embodiments, the interpreter 108 modifies metadata and/or header information for the data structure holding the containers to map the index number to the container.

At block 501, the interpreter 108 receives an instruction to store a value type in an allocated container. In an embodiment, the interpreter 108 receives the instruction as a result of stepping through the code of the invoked method. Examples of instructions that could be received by the interpreter 108 at block 501 include vstore, vastore, vload, vaload, and other above described instructions for value types. In some embodiments, the instruction received at block 501 represents a "higher level" instruction, such as JVM bytecode which the interpreter 108 is tasked with translating into one or more "lower level" instructions, such as machine code tailored to a processor of a computer system executing the virtual machine 104.

At block 502, the interpreter 108 feeds the instruction to the verifier 106 to check against a collection of rules. In some embodiments, rules are designed to create bounds on the copying and/or reallocation effort of the interpreter 108. In some embodiments, when the verifier 106 detects a rule is violated, the verifier throws an exception which is handled by special exception code.

In an embodiment, the verifier 106 constrains a container to hold only one kind of value type after being allocated for that value type. Thus, if a container is allocated to hold a value type of a particular size, the verifier 106 prevents that container from being used for any other kind of value type which might have different size requirements. As a result, the verifier 106 prevents the interpreter 108 from expending the effort of reallocating a container for multiple value types. However, in some embodiments, the interpreter 108 allows reassignment of a container to other value types provided that value type is the same size (or in some embodiments, a smaller size). In some embodiments, the aforementioned constraint is maintained until the type of the container is "reset" or the assigned value is moved elsewhere. For instance, a "reset" instruction could reset the type as well as the contents, while a "move" instruction would reset the type as well as reassign the contents to another container, such as on top of the operand stack 402. However, for embodiments which do not implement such instructions, the type could be permanently assigned to the container for the remainder of the method invocation once set.

At block 503, the interpreter 108 determines whether the value type fits into the allocated container. In an embodiment, if the value type is the same size or smaller than the size of the allocated container, the interpreter 108 proceeds to block 504. Otherwise, if the value type is larger than the size of the allocated container, the interpreter 108 proceeds to block 505.

At block 504, the interpreter 108 stores the contents of the value type into the container.

At block 505, the interpreter 108 determines whether the value type is to be stored by reference or by value. In some embodiments, the interpreter 108 considers a variety of factors to determine whether the value type is to be stored in the container by reference or by value. For example, factors could include properties of the container, the components of the value type, how the value type is utilized by lower level instructions, whether another container already stores the value type, and so forth. In some embodiments, if the value type is larger than a threshold size and determined to be immutable, the interpreter 108 chooses to store the value type by reference. Thus, for large value types the interpreter 108 can choose to store a reference to the value type instead of copying the contents of the value type. As a result, storing and processing efficiency can be achieved by preventing oversized value types from being repeatedly copied. However, since the value type is guaranteed to be immutable, there is no risk of side effects and, from the perspective of the user, there is no difference between the treatment of the value type from a primitive value. If the interpreter 108 determines that the value type is to be stored by value, the interpreter 108 proceeds to block 506. Otherwise, if the interpreter 108 determines that the value type is to be stored by reference, the interpreter 108 proceeds to block 507.

At block 506, the interpreter 108 resizes the container. In some embodiments, the interpreter 108 resizes the container by deallocating the container and then reallocating the container to a size sufficient to store the value type. However, in other embodiments, depending on the data structure used to store the container, the interpreter 108 could be configured to allocate more memory to increase the size of the container without performing a deallocation.

At block 507, the interpreter 108 allocates space for the value type on the heap 302. In an embodiment, the interpreter 108 looks up the size of the value type and allocates space on the heap 302 large enough to store the value type. The interpreter 108 then stores the value type on the heap 302 at the allocated space.

At block 508, the interpreter 108 stores a reference to the value type in the container. In an embodiment, the interpreter 108 stores a reference to the space allocated for the value type on the heap 302 at block 507.

In some embodiments, a factor in the determination at block 505 is whether another container already stores a copy of the value for the value type. In such cases, if the interpreter 108 determines to store the value type as a reference, rather than storing the value type on the heap 302 and storing a reference to the heap 302 in the container, the interpreter 108 stores a reference in the container to the other container which stores the value type. For example, rather than copying a value type from a local variable to the operand stack 402, the interpreter 108 can instead copy a reference to the container storing the value type for that local variable. As another example, rather than copying a value type from a local variable to another local variable, the interpreter 108 can instead copy a reference to the containing storing the value for the second local variable. In some embodiments, the aforementioned optimization is performed only if the value in the container is immutable to prevent side effects.

6.0 Atomic Operations

In some embodiments, the virtual machine 104 is configured to allow value types or select fields of value types to be accessed atomically. Thus, a consistent view of the value type (or the select fields) is provided to each running thread in the virtual machine 104. For example, a value type could be a composite with multiple component parts defined by the user. Depending on the hardware upon which the virtual machine 104 runs, the instruction set of the processor may not have instructions which support updating the entire value type at once. As an example, when a value type is constructed by a constructor for one thread, another thread might see an inconsistent view of that value type where only part of the value type has been updated. Many types of hardware provide mechanisms to perform atomic operations, but the mechanisms have varying degrees of overhead. Furthermore, in some cases, the hardware mechanisms could be insufficient; resulting in software implemented locking schemes which are often have very high overhead. Thus, in some embodiments, the language allows value types to be flagged for atomic access on different levels of granularity, such as the entire value type, select fields in the value type, or individual instructions accessing a value type.

In some embodiments, the issues with race conditions and atomicity are only encountered when value types are stored on the heap 302. This is because, in some embodiments, the heap 302 stores data that is shared among threads, but the thread area 307 (which includes the virtual machine stacks) stores data that is accessible only to individual threads. Thus, value types stored in a stack frame 400 (by value) are not subject to race conditions since only one thread will be accessing those value types. However, when value types are stored on the heap 302, for example as a field of an encapsulating object, multiple threads can potentially read that value, leading to race conditions.

Figure 6:
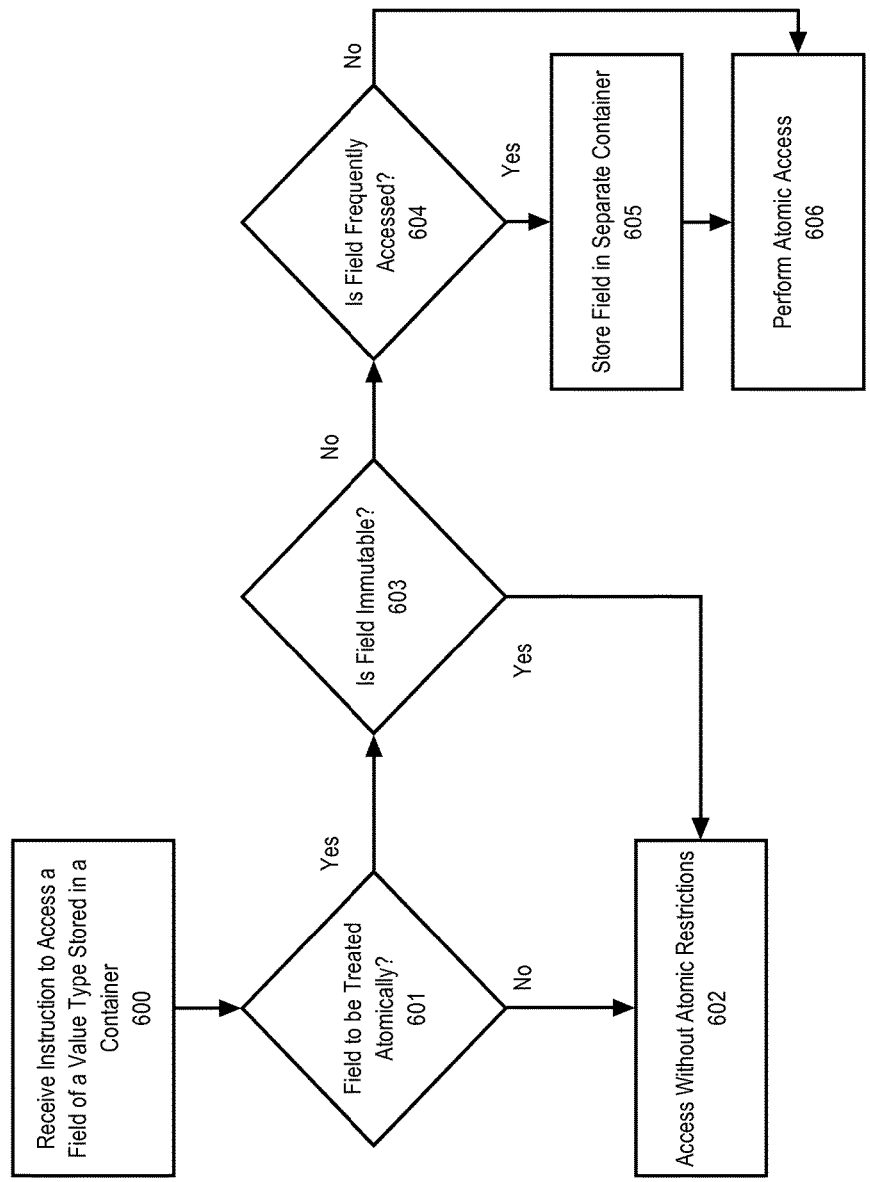
FIG. 6 illustrates a process flow for accessing a value type according to an embodiment.

FIG. 6 illustrates a process flow for accessing a value type according to an embodiment. In order to illustrate clear examples, the process flow of FIG. 6 will be explained from the perspective of the interpreter 108 of the virtual machine 104.

At block 600, the interpreter 108 receives an instruction to access a field of a value type stored in a container. In some embodiments, the interpreter 108 receives an instruction to load a value from a field of a value type or store a value to a field of a value type. For example, the vgetfield and vputfield instructions described above are examples of instructions that could be received at block 600.

At block 601, the interpreter 108 determines whether the field is to be treated atomically. If so, the interpreter 108 proceeds to block 602. Otherwise, the interpreter 108 proceeds to block 602. In an embodiment, the interpreter 108 determines the field is atomic in response to detecting one of: the value type has been marked as always being atomic, the field of the value type has been individually marked for atomic access, or the instruction being marked as being an atomic instruction. For example, in the source code files 101 the declaration of the value type, the field of the value type, or the instruction using a value type includes a keyword such as "atomic" or "always atomic". When the compiler 102 compiles the source code files 101, the class files 103 are marked with a flag or metadata that indicates those elements are to be treated atomically. The interpreter 108 can then read those class files 103 (or a representation of the class files 103 loaded into the virtual machine memory layout 300) to determine whether the field is to be treated atomically.

At block 602, the interpreter 108 performs the access without atomic restrictions. For example, the interpreter 108 can perform the access without atomic restrictions by converting the access to lower level instructions which do not provide any atomic guarantees.

At block 603, the interpreter 108 determines whether the field is immutable. In some embodiments, the field or the value type as a whole is associated with a keyword in the source code files 101 that indicates the field or value type is frozen and cannot be changed. Similar to the "atomic" keyword described above, this can be reflected in the class files 103 and/or the virtual machine memory layout 300 as flags or metadata for the interpreter 108 to read during block 603. If the field is immutable, the interpreter 108 proceeds to block 602. If the field is mutable the interpreter 108 proceeds to block 604.

At block 604, the interpreter 108 determines whether the field is frequently accessed. In some embodiments, the interpreter 108 keeps track of metadata associated with the fields of the value type or the value type itself that is incremented during each access. If the metadata indicates that the number of accesses passes a particular threshold, the interpreter 108 determines that the field is frequently accessed. However, in other embodiments a time component is also considered, such as metadata that tracks number of accesses over some representation of time (real time, computer time, number of instructions executed, and so forth). If the interpreter 108 determines that the field is frequently accessed, the interpreter 108 proceeds to block 605. If the interpreter 108 determines that the field is not frequently accessed, the interpreter 108 proceeds to block 606.

At block 605, the interpreter 108 stores the field in a separate container. In some embodiments, the interpreter 108 changes the field from a flattened form to a reference representation. References are typically quicker to access atomically than flattened values. For example, for put/store instructions, the new value for a field can be created on the heap 302 and the field can be updated atomically by updating the reference to the new memory location. Furthermore, for atomic loads, as long as the field is updated via a pointer, the loaded value either represents the entire new value or the entire old value, with no possibility of a partially updated value being reserved. As a result, atomic techniques that require significant overhead, such as locking, can be avoided.

At block 606, the interpreter 108 performs the access atomically. In an embodiment, the interpreter 108 at block 606 chooses from a plurality of techniques, a particular technique that is most efficient for the current environment. For example, the hardware executing the virtual machine 104 could support transactions or other hardware-based atomic instructions that could be used to atomically perform the access. However, in some cases the hardware might not support atomic instructions sufficient to perform the access, thus in such situations the interpreter 108 falls back on software based atomic techniques, such as performing locking. In an embodiment, the interpreter 108 prefers hardware-based atomic instructions over software-based techniques whenever possible. However, in other embodiments, the interpreter 108 has access to metadata indicating a ranking of techniques. For example, as the program runs the interpreter 108 can attempt various types of atomic access techniques and rank those based on the speed.

7.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
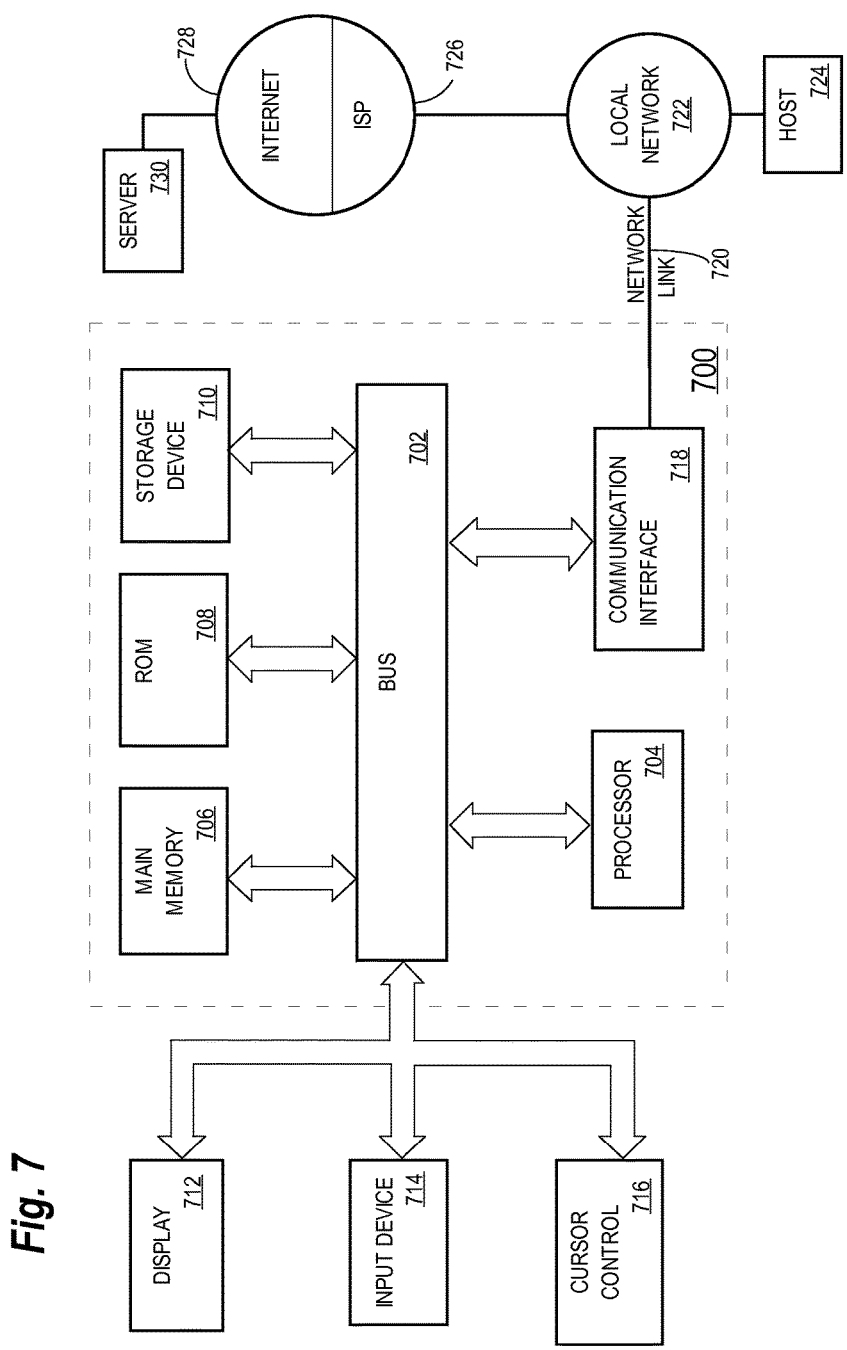
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a light emitting diode (LED) display, for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

8.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

9.0 First Additional Disclosure

Aspects of the subject matter described herein are set out in the following numbered clauses:

1. A method comprising: receiving one or more higher-level instructions specifying to assign a value of a particular value type to a particular container of a plurality of containers, wherein the plurality of containers represent a data structure for maintaining one or more variables during execution of a block of code, wherein at least two containers of the plurality of containers are different sizes; generating one or more lower-level instructions that assign the value to the particular container based on applying one or more assignment rules to the one or more higher-level instructions based on the particular value type; executing the one or more lower-level instructions; wherein the method is performed by one or more computing devices.

2. The method of Clause 1, wherein the one or more assignment rules include one or more of: a constraint limiting which value types can be assigned to the particular container, a rule that selects between loading, into the particular container, an unboxed representation of the value, or a reference to a second container that holds the value.

3. The method of Clause 2, wherein the rule that selects between loading, into the particular container, the unboxed representation of the value, or the reference to a second container that holds the value is based on one or more of: whether the value is immutable, whether the value can fit within the particular container, whether the value exceeds a particular size threshold, whether another container of the plurality of containers already stores the value, properties of components of the value, or how the value will be utilized by the one or more lower-level instructions.

4. The method of any of Clauses 2-3, wherein the plurality of containers is stored in a memory location reserved for a particular thread of a plurality of threads and the second container is external to the plurality of containers in a memory location shared by the plurality of threads.

5. The method of any of Clauses 2-4, wherein the constraint is based on one or more of: (1) determining that the particular container has already been allocated to fit one or more value types and limiting assignment to the particular container to values of the one or more value types, (2) limiting assignment to the particular container to values that share a size with the particular container or are a smaller size than the particular container, (3) limiting assignment to the particular container to one or more particular value types until an instruction to reset the particular container is received.

6. The method of any of Clauses 2-5, further comprising: in response to determining to load the unboxed representation of the value in the particular container and determining that the particular container is not able to fit the value, resizing the particular container to fit the value.

7. The method of any of Clauses 2-6, further comprising: receiving second one or more higher-level instructions specifying to change a component part of a second value stored in a second particular container, wherein the second value is of a second particular value type; generating a single lower-level instruction that identifies a portion of the second particular container that corresponds to the component part based at least partially on metadata associated with the second particular value type; executing the single lower-level instruction.

8. The method of any of Clauses 2-7, wherein identifying the portion of the second particular container includes one or more of: using field definitions of a value type definition corresponding to the second particular value type to locate the portion, using access control information of the value type definition to enforce access restrictions on the portion, or performing type checking based on the value type definition.

9. The method of any of Clauses 2-8, further comprising: receiving second one or more higher-level instructions specifying to access a component part of a second value stored in a second particular container, wherein the second value is of a second particular value type; determining whether accesses to the component part should be atomic based on metadata associated with the second particular value type; in response to determining that accesses to the component part should be atomic, determining whether the component part is stored in an immutable container; in response to determining that the component part is stored in an immutable container, generating second one or more lower-level instructions that do not provide an atomic guarantee and executing the second one or more lower-level instructions; in response to determining that the component part is not stored in an immutable container, selecting a particular mechanism of one or more mechanisms that can provide atomic access to the component part, generating third one or more lower-level instructions that provide an atomic guarantee based on the particular mechanism, and executing the third one or more lower-level instructions.

10. The method of any of Clauses 2-9, wherein the second value is stored in a first container and further comprising: in response to determining that the component part is not stored in an immutable container, determining whether an access frequency of the component part exceeds an access threshold; in response to determining that the access frequency of the component part exceeds the access threshold, storing the component part in a separate second container and storing a reference in the first container to the second container for the component part.

11. The method of any of Clauses 2-10, wherein the one or more mechanisms that can provide atomic access to the component part are based on a set of instructions supported by one or more processors of the one or more computing devices.

12. One or more non-transitory computer-readable media storing instructions that, when executed by one or more computing devices, causes performance of any one of the methods recited in Clauses 1-11.

13. A system comprising one or more computing devices comprising components, implemented at least partially by computing hardware, configured to implement the steps of any one of the methods recited in Clauses 1-11.

10.0 Second Additional Disclosure

According to an embodiment, lower-level instructions are generated from higher-level instructions, such as when compiling Java or other source code into bytecode or in any other suitable programming environment. The lower-level instructions include instructions that access values within containers, such as local variables, stack elements, registers, virtual registers, and/or other named virtual variables of a run-time data area. The containers have varying sizes so as, for example, to be capable of storing values of varying sizes directly instead of by reference to containers in a heap or other memory area.

The higher-level instruction involves a value of a certain value type. The value may be, for example, a non-primitive composite value, such as Point or Complex, that is composed of a number of components. The certain value type may be, for example, defined by a class, of which the value is an instance. Responsive to the higher-level instruction, a lower-level instruction may be generated to load the value, or, in some cases, a reference to the value into one of the variably sized containers. One example of such a lower-level instruction is the vaload instruction described herein. Or, the lower-level instruction may store, modify, move, and/or reset the container. In either case, the lower-level instruction is generated based upon the certain value type and on one or more assignment rules relative to the certain value type. Such assignment rules may be configured, for instance, to bound the costs associated with maintaining containers that support varying sizes, as opposed to containers of a predefined fixed size, and/or to bound the costs of maintaining multiple copies of values copied between containers.

In an embodiment, the assignment rule(s) may include, for example, one or more constraints upon which different value types may be loaded into the container over the invocation of a method. In an embodiment, one example of such constraint may specify that the values loaded into a container over the course of the method may be of at most one data type, or a limited set of data types. Thus, a given container may only hold values of the value type for which the container was originally allocated, and, optionally, primitives or references. Optionally, this constraint may last until the type of the container is reset, or the assigned value is moved elsewhere. For instance, a "reset" instruction would reset the type as well as the contents, while a "move" instruction would reset the type as well as reassign the contents to another container, such as top of stack. A move operation would apply concepts of linear or ownership types to interpreter efficiency.

In an embodiment, another example constraint may be that the values assigned to a container must all be of value types guaranteed to be of no greater size than a specified size, or alternatively guaranteed to be of the exact same size. In an embodiment, another example constraint may be that the values loaded into a given container over the course of the method may be of varying data types, but if the given container is used to store a value type, it cannot be used to store a different type (optionally, until the container is reset).

In an embodiment, another example of an assignment rule is a rule that optimally selects between loading, into the container, an unboxed representation of the value, or a reference to an external container that holds the value. Such a rule may consider factors such as the properties of the external container or the components of the value or how the value is utilized within the lower-level instructions. For example, the rule may be based on whether the value is, effectively, immutable within the external container. In an embodiment, another example of an assignment rule is a constraint upon loading a value into a first container if a second container already contains a copy of the first container's value. Any other suitable assignment rule may also or instead be utilized.

According to an embodiment, certain steps are performed during a verification of a set of instructions, such as a verification by a bytecode verifier prior to an interpreter interpreting the bytecode. For instance, the steps may be performed when verifying the lower-level instructions generated according to the techniques described above. The steps include identifying an instruction that loads a value into a container in a group of containers having varying sizes. The steps further include verifying that the instruction conforms to one or more constraints based on a value type of the value to be loaded in the container. The constraints may include, in an embodiment, one or more of the assignment rules and/or constraints described above.

According to an embodiment, while generating lower-level instructions from higher-level instructions, one or more higher-level instructions that change a field within a value of a certain value type may be identified. The value may be, for instance, an instance of a value type, potentially having multiple different component fields. Examples of such value types, such as Point or Complex, are described herein. It may be determined that, within the context of the lower-level instructions, data for at least one component field of the value are to be stored collectively within a single container. For instance, the field may be stored as an unboxed representation of its corresponding subvalue, as opposed to a reference to other container(s) which store the corresponding subvalue. Responsive to this determination, a single lower-level instruction is generated. One example of such a lower-level instruction is the vput instruction described herein.

The single lower-level instruction that is generated is configured to instruct an interpreter to identify a portion, such as one or more bits, of the container that correspond to the field. The single lower-level instruction is further configured to instruct an interpreter to change the portion, in accordance with the one or more higher-level instructions. The identification and/or changing may be based at least partially on metadata associated with the value type of the value. For instance, the instruction may cause the interpreter to use field definitions for the value type to locate the portion, and/or to enforce access control information, type checking, and so forth for the corresponding value type definition. In an embodiment, the single lower-level instruction instructs the interpreter to do this without the use of pointers to locate the fields, and/or without having to issue another command to open up the value into its component fields.

In an embodiment, the lower-level instructions are optionally generated by reordering, merging, or separating the effects of two or more such lower-level instructions relative to each other and relative to any other instructions which may read or write the value stored in a container, or at least some of its component fields. This reordering, merging, or separation of effects may be subject to rules which protect the consistency of each component field of a value stored in a container, as well as the value as a whole stored in a container. Hence, the techniques may involve using a nested memory model of data structures that are hierarchical, as objects split into values, which may split into smaller values, and which eventually split all the way down to components primitives and references.

According to an embodiment, a method comprises: while interpreting instructions, such as Java bytecode, that identify an instruction to insert a first and smaller value as a field of a second and larger value. The instruction may be, for instance, a single lower-level instruction such as generated above. The second value may be, for example, a value of a defined value type having multiple different component fields that are collectively stored in a container. The first value may be, for example, a sub-value corresponding to a field. In an embodiment, it is determined that the second value is of a certain value type. Based on metadata associated with the certain value type, a portion of the second value that corresponds to the field is located, and the first value is loaded into the portion. This may comprise, for instance, enforcing access control information and type checking based on value type definition data associated with the certain value type, and/or using the value type definition data to locate the relevant portion. In an embodiment, the lower-level instructions are optionally generated by reordering, merging, or separating the effects of two or more such lower-level instructions, such as described above.

According to an embodiment, code may access a field of a value that is intended to be atomic. Such code may include, for instance, instructions such as getfield or putfield. The value may be atomic as a result of, for example, a declaration in the definition of a value type of which the value is an instance, or of a declaration when the value was instantiated, and/or of a default configuration of the interpreter or compiler. Responsive to this code, a compiler or interpreter may make one or more determinations relevant to deciding whether to implement a locking strategy when accessing the field and/or which locking strategy to implement.

In an embodiment, one such determination is whether the field is immutable. For example, the field may be confined to the executing thread, the field may be a "frozen" field, and/or the field may be declared as final. If the field is immutable, instruction(s) to access the field without locking may be generated. In an embodiment, another such determination is whether the executing hardware has transactional support. If so, transactional version(s) of instruction(s) to the hardware are generated for accessing the field, so as to ensure that the access is handled transactionally.

In an embodiment, another such determination is whether the field is frequently changing, and/or whether the value is complex or frequently accessed. If so, instruction(s) are generated to store the field within a separate container, such as a container referenced within the value by a pointer, rather than directly within a container that stores the value. The instruction(s) access the field via the separate container. In an embodiment, another such determination is whether the value is a large value that has been divided into sub-values. The value may actually be divided and stored amongst separate containers, or the value may be divided logically for the purpose of locking. If so, instruction(s) to access the field are generated by locking the sub-value in which the field resides. In an embodiment, another such determination is whether the value is itself a field of another value. If so, a locking strategy is selected based thereon. Any other suitable determination may also or instead be made. In an embodiment, a series of determinations is made. The determinations estimated to be cheapest from a resource perspective are performed first, and other determinations are performed only as needed.

In other aspects, systems of computing devices and computer-readable media are disclosed for implementing the techniques described herein.

What is claimed is:

1. A method for implementing higher-level instructions by generating and executing corresponding lower-level instructions, the method comprising:
receiving one or more higher-level instructions specifying to assign an aggregate value of a particular value type to a particular container of a plurality of containers, wherein the particular value type is an aggregate type, wherein the plurality of containers represent a data structure for maintaining one or more variables;
generating one or more lower-level instructions that:
refer to a particular storage mechanism of one or more storage mechanisms that:
a) are transparent to the higher-level instructions, b) can store said aggregate type, and c) include a register storage mechanism, and
assign the aggregate value to the particular container based on applying one or more assignment rules to the one or more higher-level instructions based on the particular value type, including applying an assignment rule that selects between loading, into the particular container, an unboxed representation of the aggregate value, or a reference to second container that holds the aggregate value, wherein at least one assignment rule of the one or more assignment rules specifies storing, in memory reserved for a particular thread of a plurality of threads of a same program, said aggregate value of the particular value type;
wherein the plurality of containers is stored in the memory reserved for the particular thread of the plurality of threads and the second container is external to the plurality of containers in a memory location shared by the plurality of threads;
executing the one or more lower-level instructions;
wherein the method is performed by one or more computing devices.

2. The method of claim 1, wherein the one or more assignment rules include
a constraint limiting which value types can be assigned to the particular container.

3. The method of claim 1, wherein the assignment rule that selects between loading, into the particular container, the unboxed representation of the aggregate value, or the reference to a second container that holds the aggregate value is based on one or more of:

whether the aggregate value is immutable,
whether the aggregate value can fit within the particular container,
whether another container of the plurality of containers already stores the aggregate value, or
properties of components of the aggregate value.

4. The method of claim 2, wherein the constraint is based on one or more of:
   (1) limiting assignment to the particular container to values that share a size with the particular container or are a smaller size than the particular container, or
   (2) limiting assignment to the particular container to one or more particular value types until an instruction to reset the particular container is received.

5. The method of claim 1, further comprising:
   in response to determining to load the unboxed representation of the aggregate value in the particular container and determining that the particular container is not able to fit the aggregate value, resizing the particular container to fit the aggregate value.

6. The method of claim 1, further comprising:
   receiving second one or more higher-level instructions specifying to change a component part of a second value stored in a second particular container, wherein the second value is of a second particular value type;
   generating a single lower-level instruction that identifies a portion of the second particular container that corresponds to the component part based at least partially on metadata associated with the second particular value type;
   executing the single lower-level instruction.

7. The method of claim 6, wherein identifying the portion of the second particular container includes one or more of:
   using field definitions of a value type definition corresponding to the second particular value type to locate the portion, using access control information of the value type definition to enforce access restrictions on the portion, or performing type checking based on the value type definition.

8. A method comprising:
   receiving one or more higher-level instructions specifying to assign a value of a particular value type to a particular container of a plurality of containers, wherein the plurality of containers represent a data structure for maintaining one or more variables during execution of a block of code, wherein at least two containers of the plurality of containers are different sizes;
   generating one or more lower-level instructions that assign the value to the particular container based on applying one or more assignment rules to the one or more higher-level instructions based on the particular value type;
   executing the one or more lower-level instructions;
   receiving second one or more higher-level instructions specifying to access a component part of a second value stored in a second particular container, wherein the second value is of a second particular value type;
   determining whether accesses to the component part should be atomic based on metadata associated with the second particular value type;
   in response to determining that accesses to the component part should be atomic, determining whether the component part is stored in an immutable container;
   in response to determining that the component part is stored in an immutable container, generating second one or more lower-level instructions that do not provide an atomic guarantee and executing the second one or more lower-level instructions;
   in response to determining that the component part is not stored in an immutable container, selecting a particular mechanism of one or more mechanisms that can provide atomic access to the component part, generating third one or more lower-level instructions that provide an atomic guarantee based on the particular mechanism, and executing the third one or more lower-level instructions;
   wherein the method is performed by one or more computing devices.

9. The method of claim 8, wherein the second value is stored in a first container and further comprising:
   in response to determining that the component part is not stored in an immutable container, determining whether an access frequency of the component part exceeds an access threshold;
   in response to determining that the access frequency of the component part exceeds the access threshold, storing the component part in a separate second container and storing a reference in the first container to the second container for the component part.

10. The method of claim 8, wherein the one or more mechanisms that can provide atomic access to the component part are based on a set of instructions supported by one or more processors of the one or more computing devices.

11. One or more non-transitory computer-readable storage mediums storing one or more instructions which, when executed by one or more processors, cause:
    receiving one or more higher-level instructions specifying to assign an aggregate value of a particular value type to a particular container of a plurality of containers, wherein the particular value type is an aggregate type, wherein the plurality of containers represent a data structure for maintaining one or more variables;
    generating one or more lower-level instructions that:
      refer to a particular storage mechanism of one or more storage mechanisms that:
        a) are transparent to the higher-level instructions, b) can store said aggregate type, and c) include a register storage mechanism, and
      assign the aggregate value to the particular container based on applying one or more assignment rules to the one or more higher-level instructions based on the particular value type, including applying an assignment rule that selects between loading, into the particular container, an unboxed representation of the aggregate value, or a reference to a second container that holds the aggregate value, wherein at least one assignment rule of the one or more assignment rules specifies storing, in memory reserved for a particular thread of a plurality of threads of a same program, said aggregate value of the particular value type;
    wherein the plurality of containers is stored in the memory reserved for the particular thread of the plurality of threads and the second container is external to the plurality of containers in a memory location shared by the plurality of threads;
    executing the one or more lower-level instructions.

12. The one or more non-transitory computer-readable storage mediums of claim 11, wherein the one or more assignment rules include
    a constraint limiting which value types can be assigned to the particular container.

13. The one or more non-transitory computer-readable storage mediums of claim 11, wherein the assignment rule that selects between loading, into the particular container, the unboxed representation of the aggregate value, or the reference to a second container that holds the aggregate value is based on one or more of:
  whether the aggregate value is immutable,
  whether the aggregate value can fit within the particular container,
  whether another container of the plurality of containers already stores the aggregate value, or
  properties of components of the aggregate value.

14. The one or more non-transitory computer-readable storage mediums of claim 12, wherein the constraint is based on one or more of:
  (1) limiting assignment to the particular container to values that share a size with the particular container or are a smaller size than the particular container, or
  (2) limiting assignment to the particular container to one or more particular value types until an instruction to reset the particular container is received.

15. The one or more non-transitory computer-readable storage mediums of claim 11, wherein the instructions further cause in response to determining to load the unboxed representation of the aggregate value in the particular container and determining that the particular container is not able to fit the aggregate value, resizing the particular container to fit the aggregate value.

16. The one or more non-transitory computer-readable storage mediums of claim 11, wherein the instructions further cause:
  receiving second one or more higher-level instructions specifying to change a component part of a second value stored in a second particular container, wherein the second value is of a second particular value type;
  generating a single lower-level instruction that identifies a portion of the second particular container that corresponds to the component part based at least partially on metadata associated with the second particular value type;
  executing the single lower-level instruction.

17. The one or more non-transitory computer-readable storage mediums of claim 16, wherein identifying the portion of the second particular container includes one or more of:
  using field definitions of a value type definition corresponding to the second particular value type to locate the portion, using access control information of the value type definition to enforce access restrictions on the portion, or performing type checking based on the value type definition.

18. One or more non-transitory computer-readable storage mediums storing one or more instructions which, when executed by one or more processors, cause:
  receiving one or more higher-level instructions specifying to assign a value of a particular value type to a particular container of a plurality of containers, wherein the plurality of containers represent a data structure for maintaining one or more variables during execution of a block of code, wherein at least two containers of the plurality of containers are different sizes;
  generating one or more lower-level instructions that assign the value to the particular container based on applying one or more assignment rules to the one or more higher-level instructions based on the particular value type;
  executing the one or more lower-level instructions;
  receiving second one or more higher-level instructions specifying to access a component part of a second value stored in a second particular container, wherein the second value is of a second particular value type;
  determining whether accesses to the component part should be atomic based on metadata associated with the second particular value type;
  in response to determining that accesses to the component part should be atomic, determining whether the component part is stored in an immutable container;
  in response to determining that the component part is stored in an immutable container, generating second one or more lower-level instructions that do not provide an atomic guarantee and executing the second one or more lower-level instructions;
  in response to determining that the component part is not stored in an immutable container, selecting a particular mechanism of one or more mechanisms that can provide atomic access to the component part, generating third one or more lower-level instructions that provide an atomic guarantee based on the particular mechanism, and executing the third one or more lower-level instructions.

19. The one or more non-transitory computer-readable storage mediums of claim 18, wherein the second value is stored in a first container and the instructions further cause:
  in response to determining that the component part is not stored in an immutable container, determining whether an access frequency of the component part exceeds an access threshold;
  in response to determining that the access frequency of the component part exceeds the access threshold, storing the component part in a separate second container and storing a reference in the first container to the second container for the component part.

20. The one or more non-transitory computer-readable storage mediums of claim 18, wherein the one or more mechanisms that can provide atomic access to the component part are based on a set of instructions supported by the one or more processors.

21. The method of claim 1 further comprising storing an aggregate value into one or more registers.

* * * * *

UNITED STATES PATENT AND TRADEMARK OFFICE
CERTIFICATE OF CORRECTION

PATENT NO. : 10,261,764 B2
APPLICATION NO. : 14/699129
DATED : April 16, 2019
INVENTOR(S) : Rose et al.

Page 1 of 1

It is certified that error appears in the above-identified patent and that said Letters Patent is hereby corrected as shown below:

In the Specification

In Column 34, Line 66, delete "interfaces. it is." and insert -- interfaces. --, therefor.

In Column 37, Line 1, delete "'WasARef'" and insert -- 'WasARef" --, therefor.

In the Claims

In Column 52, Line 44, in Claim 1, after "to" insert -- a --.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*